(12) United States Patent
Moshfeghi

(10) Patent No.: US 8,838,477 B2
(45) Date of Patent: Sep. 16, 2014

(54) METHOD AND SYSTEM FOR COMMUNICATING LOCATION OF A MOBILE DEVICE FOR HANDS-FREE PAYMENT

(75) Inventor: Mehran Moshfeghi, Rancho Palos Verdes, CA (US)

(73) Assignee: Golba LLC, Rancho Palos Verdes, CA (US)

( * ) Notice: Subject to any disclaimer, the term of this patent is extended or adjusted under 35 U.S.C. 154(b) by 96 days.

(21) Appl. No.: 13/422,795

(22) Filed: Mar. 16, 2012

(65) Prior Publication Data

US 2012/0316963 A1  Dec. 13, 2012

Related U.S. Application Data

(60) Provisional application No. 61/511,963, filed on Jul. 26, 2011, provisional application No. 61/495,045, filed on Jun. 9, 2011.

(51) Int. Cl.
*G06Q 20/20* (2012.01)

(52) U.S. Cl.
USPC .............. 705/14.58; 705/16; 705/21; 705/18; 235/380; 455/456.1; 455/41.1; 709/227

(58) Field of Classification Search
USPC ................. 705/16, 21, 14.4; 235/383, 376; 340/10.31
See application file for complete search history.

(56) References Cited

U.S. PATENT DOCUMENTS

| | | |
|---|---|---|
| 5,323,322 A | 6/1994 | Mueller et al. |
| 5,796,773 A | 8/1998 | Sheynblat |
| 5,841,971 A | 11/1998 | Longginou et al. |
| 5,874,914 A | 2/1999 | Krasner |
| 5,884,220 A | 3/1999 | Farmer et al. |
| 5,999,124 A | 12/1999 | Sheynblat |
| 6,061,632 A | 5/2000 | Dreier |
| 6,131,067 A | 10/2000 | Girerd et al. |

(Continued)

FOREIGN PATENT DOCUMENTS

| | | |
|---|---|---|
| CA | 2150757 | 5/2003 |
| JP | 2006112822 | 4/2006 |
| WO | 94/12892 | 6/1994 |

OTHER PUBLICATIONS

Portions of prosecution History of U.S. Appl. No. 11/940,219, filed Apr. 17, 2012, Moshfeghi, Mehran.

(Continued)

*Primary Examiner* — Vanel Frenel
(74) *Attorney, Agent, or Firm* — Adeli LLP

(57) ABSTRACT

Certain aspects of a method and system for communicating location of a mobile device for hands-free payment may include a peer-to-peer ad-hoc network that comprises a plurality of mobile devices, a plurality of access points, and a plurality of point of sale (POS) devices. A first mobile device may determine its location coordinates and communicate them to a selected POS device via the peer to peer ad-hoc network. At least one of the plurality of mobile devices and/or the plurality of access points may be within a defined proximity of the selected POS device. In some instances, the first POS device may receive via one or more intermediate mobile devices in the peer-to-peer ad-hoc network, location coordinates and payment transaction information of a selected mobile device. At least one of the intermediate mobile devices may be within a defined proximity of the first POS device.

36 Claims, 8 Drawing Sheets

(56) References Cited

U.S. PATENT DOCUMENTS

| | | | |
|---|---|---|---|
| 6,185,427 | B1 | 2/2001 | Krasner et al. |
| 6,204,808 | B1 | 3/2001 | Bloebaum et al. |
| 6,215,441 | B1 | 4/2001 | Moeglein et al. |
| 6,249,245 | B1 | 6/2001 | Watters et al. |
| 6,323,803 | B1 | 11/2001 | Jolley et al. |
| 6,323,806 | B1 | 11/2001 | Greving |
| 6,531,981 | B1 | 3/2003 | Fuller et al. |
| 6,657,586 | B2 | 12/2003 | Turner |
| 6,693,592 | B2 | 2/2004 | Dowdle et al. |
| 6,700,533 | B1 | 3/2004 | Werb et al. |
| 6,853,847 | B2 | 2/2005 | Shioda et al. |
| 6,920,330 | B2 | 7/2005 | Caronni et al. |
| 7,130,646 | B2 | 10/2006 | Wang |
| 7,433,694 | B2 | 10/2008 | Morgan et al. |
| 7,755,541 | B2 | 7/2010 | Wisherd et al. |
| 7,848,765 | B2 * | 12/2010 | Phillips et al. ............ 455/456.3 |
| 8,193,978 | B2 | 6/2012 | Moshfeghi |
| 8,294,554 | B2 | 10/2012 | Shoarinejad et al. |
| 8,570,216 | B2 | 10/2013 | Gutt et al. |
| 2005/0030160 | A1 | 2/2005 | Goren et al. |
| 2005/0088284 | A1 | 4/2005 | Zai et al. |
| 2005/0124355 | A1 | 6/2005 | Cromer et al. |
| 2005/0190789 | A1 | 9/2005 | Salkini et al. |
| 2005/0195777 | A1 | 9/2005 | Green |
| 2005/0198228 | A1 | 9/2005 | Bajwa et al. |
| 2005/0242188 | A1 | 11/2005 | Vesuna |
| 2005/0281363 | A1 | 12/2005 | Qi et al. |
| 2007/0216540 | A1 | 9/2007 | Riley et al. |
| 2007/0252758 | A1 | 11/2007 | Loomis |
| 2008/0108371 | A1 | 5/2008 | Alizadeh-Shabdiz et al. |
| 2008/0284646 | A1 | 11/2008 | Walley et al. |
| 2009/0182630 | A1 * | 7/2009 | Otto et al. ....................... 705/14 |
| 2009/0214039 | A1 | 8/2009 | Chen et al. |
| 2010/0161718 | A1 | 6/2010 | Soelberg et al. |
| 2011/0029400 | A1 | 2/2011 | Scipioni |
| 2011/0131104 | A1 | 6/2011 | Rose et al. |
| 2011/0251892 | A1 * | 10/2011 | Laracey .................... 705/14.51 |
| 2012/0072350 | A1 * | 3/2012 | Goldthwaite et al. ......... 705/44 |
| 2012/0089469 | A1 * | 4/2012 | Bonalle et al. ................. 705/16 |
| 2012/0124346 | A1 | 5/2012 | Hardage et al. |
| 2012/0209657 | A1 | 8/2012 | Connolly |
| 2012/0246079 | A1 * | 9/2012 | Wilson et al. .................. 705/67 |
| 2012/0253913 | A1 | 10/2012 | Richard |
| 2012/0280859 | A1 | 11/2012 | Moshfeghi |
| 2012/0303425 | A1 | 11/2012 | Katzin et al. |
| 2012/0323777 | A1 * | 12/2012 | Liberty .......................... 705/41 |
| 2012/0330763 | A1 | 12/2012 | Gangi |
| 2013/0029685 | A1 | 1/2013 | Moshfeghi |
| 2013/0029686 | A1 | 1/2013 | Moshfeghi |
| 2013/0030931 | A1 | 1/2013 | Moshfeghi |

OTHER PUBLICATIONS

Portions of prosecution history of U.S. Appl. No. 13/471,369, filed Jan. 27, 2014, Moshfeghi, Mehran.

Portions of prosecution history of U.S. Appl. No. 13/556,792, filed Mar. 5, 2014, Moshfeghi, Mehran.

Portions of prosecution history of U.S. Appl. No. 13/556,809, filed Mar. 5, 2014, Moshfeghi, Mehran.

Author Unknown, "Cisco Application-Oriented Networking Facilitates Intelligent Radio Frequency Identification Processing at the Edge," Month Unknown, 2005, pp. 1-9, Cisco Systems.

Author Unknown, "ConnecTerra Product Family," www.connecterra.com, Month Unknown, 2005, pp. 1-2, ConnecTerra.

Author Unknown, "Delivering an Intelligent Foundation for RFID: Maximizing Network Efficiency With Cisco RFID Solutions," Month Unknown, 2005, pp. 1-6, Cisco Systems.

Author Unknown, "Establishing the Foundation for Enterprise-Scale RFID Deployments," www.connecterra.com/products/rftagaware.php, Sep. 2004, pp. 1-2, ConnecTerra.

Author Unknown, "Four Challenges," Month Unknown, 2004, pp. 1-7, ConnecTerra.

Author Unknown, "Installation Manual R500HA Long Range RFID Reader," www.iautomate.com, Month Unknown, 2005, pp. 1-40, iAutomate.

Portions of prosecution history of U.S. Appl. No. 13/422,823, filed Feb. 28, 2014, Moshfeghi, Mehran Author Unknown, "RFTagAware™ Enterprise Server, Centralized EPC Data Management and Reporting for Enterprise-Scale RFID Deployments", www.connecterra.com, Month Unknown, 2005,2 pages, ConnecTerra, Cambridge, MA.

Author Unknown, "The Sun Global RFID Network Vision: Connecting Businesses at the Edge of the Network," A Technical White Paper, Jul. 2004, 20 pages, Sun Microsystems, Santa Clara, CA.

Chun, Sebum, et al., "Performance Analysis of GPS Integer Ambiguity Resolution Using External Aiding Information," Journal of Global Positioning Systems, Month Unknown, 2005, vol. 4, No. 1-2, pp. 201-206.

Clark, Sean, et al., "Auto-ID Savant Specification 1.0", Sep. 2003, pp. 1-58, Auto-ID Center.

Dana, Peter H., "Global Positioning System Overview," Sep. 1994, 14 pages, www.colorado.edu/geography/gcraft/notes/gps/gps_f.html.

* cited by examiner

METHOD AND SYSTEM FOR COMMUNICATING LOCATION OF A MOBILE DEVICE FOR HANDS-FREE PAYMENT

CROSS-REFERENCE TO RELATED APPLICATIONS/INCORPORATION BY REFERENCE

This patent application makes reference to, claims priority to and claims benefit from U.S. Provisional Patent Application Ser. No. 61/495,045 filed on Jun. 9, 2011. This patent application also makes reference to, claims priority to and claims benefit from U.S. Provisional Patent Application Ser. No. 61/511,963 filed on Jul. 26, 2011.

This application also makes reference to:
U.S. application Ser. No. 13/422,823, now published as United States Patent Publication 2013-0030931, which is filed on even date herewith;
U.S. application Ser. No. 12/852,443 filed Aug. 6, 2010, now issued as U.S. Pat. No. 8,314,736;
U.S. application Ser. No. 12/833,938 filed Jul. 9, 2010, now issued as U.S. Pat. No. 8,344,949;
U.S. application Ser. No. 11/940,219 filed Nov. 14, 2007, now issued as U.S. Pat. No. 8,193,978;
U.S. application Ser. No. 12/852,446 filed Aug. 6, 2010, now published as U.S. Patent Publication 2011-0035284;
U.S. application Ser. No. 11/641,624 filed Dec. 18, 2006, now issued as U.S. Pat. No. 8,294,554; and
U.S. application Ser. No. 12/843,868 filed Jul. 6, 2010, now issued as U.S. Pat. No. 8,421,676.

Each of the above stated applications is hereby incorporated herein by reference in its entirety.

FIELD OF THE INVENTION

Certain embodiments of the invention relate to electronic payment transaction systems. More specifically, certain embodiments of the invention relate to a method and system for communicating location of a mobile device for hands-free payment.

BACKGROUND OF THE INVENTION

Web-based deal advertising companies offer deals to consumers with incentives to use centralized server-based social networking sites. One of the limitations of these approaches is that the deals are offered by stores and advertised by deal advertising companies, or the stores themselves, without knowledge of the location of their subscribed members and other shoppers. The location of a person, however, may be important in brick and mortar shopping, since people are more likely to buy from stores that are in their close proximity. Another limitation of current deal advertising approaches is that they use traditional social networking where the deal is recommended or forwarded to one's friends. However, most of those friends may not be physically near the recommended stores. On the other hand, if a person is near a deal store then there may be many other shoppers nearby that are not his/her friend but who may be looking for similar deals and coupons.

The proliferation of mobile devices such as smart phones, netbooks and tablet computers has led to a growing need to obtain accurate location information of such devices. Wireless positioning may involve obtaining wireless signals and processing the signals into a location estimate. The typical information used for positioning, such as Global Positioning System (GPS) signals, may be processed to find the position of a wireless device. For example, triangulation may be used where multiple range or angle measurements from known positions are used to calculate the position of a device.

The location-aware systems may differ in terms of accuracy, coverage, cost of installation, and maintenance of the systems. The GPS systems may use satellite signals and work in outdoor environments. However, they require direct line of sight and do not work well in an indoor environment. Cell tower triangulation is another method that uses signals from cellular towers to locate a wireless user. This method may also be limited in accuracy and reliability because of the coarse number of cell towers from a particular service provider that a mobile user can communicate with, as well as multipath issues.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for communicating location of a mobile device for hands-free payment, substantially as shown in and/or described in connection with at least one of the figures, as set forth more completely in the claims.

These and other features and advantages of the present invention may be appreciated from a review of the following detailed description of the present invention, along with the accompanying figures in which like reference numerals refer to like parts throughout.

DETAILED DESCRIPTION OF THE INVENTION

Certain embodiments of the invention may be found in a system and/or method for communicating location of a mobile device for hands-free payment. Exemplary aspects of the invention may comprise a peer-to-peer ad-hoc network that comprises a plurality of mobile devices, a plurality of access points, and a plurality of point of sale (POS) devices. A first mobile device may determine its location coordinates and communicate them to a selected POS device via the peer to peer ad-hoc network. At least one of the plurality of mobile devices and/or the plurality of access points may be within a defined proximity of the selected POS device.

In accordance with another embodiment of the invention, the peer-to-peer ad-hoc network may comprise a plurality of mobile devices and a plurality of POS devices. The first POS device may be operable to receive via one or more intermediate ones of the plurality of mobile devices in the peer-to-peer ad-hoc network, location coordinates and payment transaction information of a selected mobile device. At least one of the one or more intermediate ones of the plurality of mobile devices may be within a defined proximity of the first POS device.

Figure 1:
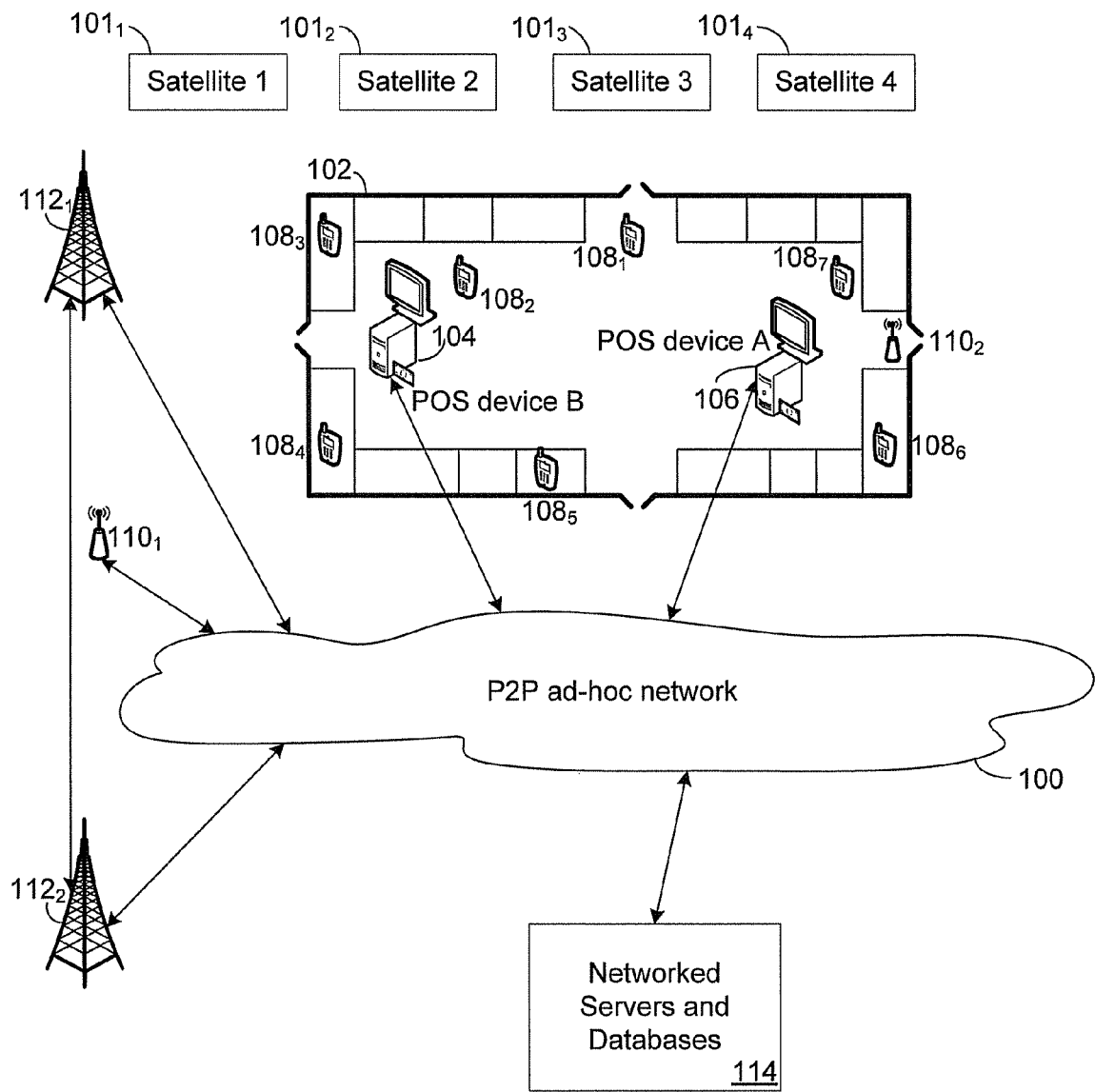
FIG. 1 is a block diagram illustrating communication of information in an exemplary peer-to-peer ad-hoc network, in accordance with an embodiment of the invention.

FIG. 1 is a block diagram illustrating communication of information in an exemplary peer-to-peer ad-hoc network, in accordance with an embodiment of the invention. Referring to FIG. 1, there is shown a peer-to-peer ad-hoc network 100, a shopping mall 102, and a plurality of satellites $101_1 \ldots 101_4$. The peer-to-peer ad-hoc network 100 may comprise a plurality of point of sale (POS) devices 104 and 106, a plurality of access points $110_1$ and $110_2$, a plurality of cellular towers $112_1$ and $112_2$, and a plurality of mobile devices $108_1 \ldots 108_7$. A plurality of network servers and databases 114 may be coupled to the peer-to-peer ad-hoc network 100. Notwithstanding, the invention may not be so limited, and the plurality of POS devices 104 and 106 may be connected directly to the Internet, without limiting the scope of the invention.

The shopping mall 102 may comprise a plurality of retail stores in a shopping area such as a mall that may sell goods and services, which may be referred to as items. The networked servers and databases 114 may comprise a plurality of servers, for example, a deal advertising server, an ad-hoc social networking server, an information server, and a communication and content server, for example. In accordance with an embodiment of the invention, one or more of the plurality of networked servers and databases may be part of one or more of the plurality of POS devices 104 and 106. The networked servers and databases 114 may also comprise a plurality of databases, for example, a member profile database, a member location database, a member usage database, a member referral database, a member order database, a member wish-list database, a product database, and a store profile and rule database.

The plurality of satellites $101_1 \ldots 101_4$, access points $110_1$ and $110_2$, and/or cellular towers $112_1$ and $112_2$ in the geographical area of interest may be Multiple-Input Multiple-Output (MIMO) systems that have multiple antennas which transmit independently and accordingly improve the accuracy by providing more channel characteristics or parameters.

The plurality of POS devices 104 and 106 may comprise suitable logic, circuitry, interfaces, and/or code that may be operable to record and track customer orders, process credit and debit cards, process electronic commerce payment transactions, connect to other systems in a network, purchasing, receiving and transferring of products to and from other locations, and/or manage inventory.

Each of the plurality of mobile devices $108_1 \ldots 108_7$ may comprise suitable logic, circuitry, interfaces, and/or code that may be operable to communicate utilizing one or more communication protocols. In this regard, the plurality of mobile devices $108_1 \ldots 108_7$ may each be operable to transmit and/or receive data via Wireless Local Area Network (WLAN), Bluetooth, WiMax, HD Radio, Ultra-wideband (UWB), GPS, cellular, near field communication (NFC), and/or 60 GHz protocols. Exemplary mobile devices may comprise laptop computers, mobile phones, personal digital assistants and/or personal media players, for example, or some other wireless device that is network capable and can send and receive information. The plurality of mobile devices $108_1 \ldots 108_7$ may be operable to receive, process, and present multimedia content and may additionally be enabled to run a network browser or other applications for providing Internet services to a user of the mobile device. In accordance with an embodiment of the invention, the plurality of mobile devices $108_1 \ldots 108_7$ may comprise one or more application-specific programs for electronic payment transactions.

The peer-to-peer ad-hoc network 100 may allow mobile devices $108_1 \ldots 108_7$ to directly communicate with each other. The peer-to-peer ad-hoc network 100 may grow or shrink without having to make any requests or reports to a central authority. When mobile devices $108_1 \ldots 108_7$ are operating in ad-hoc mode, they may act as network nodes that may discover and communicate with other wireless network nodes that are within their range of communication. This communication happens in peer-to-peer mode without requiring a wireless access point or router. Both Bluetooth and Wi-Fi standards may provide peer-to-peer connectivity. Notwithstanding, other wireless standards that provide peer-to-peer connectivity may be used without limiting the scope of the invention. The peer-to-peer ad-hoc network 100 may use an access point $110_2$ or gateway to connect to the Internet, for example. A mobile device that acts as a base-station may also be used to connect other mobile devices in a peer-to-peer ad-hoc network.

In accordance with an embodiment of the invention, Bluetooth wireless protocol may be used to provide short-range peer-to-peer connections between mobile devices $108_1 \ldots 108_7$. A Bluetooth network may be made up of small subnets or piconets. A piconet may consist of two or more connected nodes sharing the same channel. Every piconet may have one master and several slaves, where the slaves may use the master to communicate with each other. Two or more piconets that have a node in common may connect with each other to form a scatternet. A slave node in one piconet may be a master node in another piconet. The range of Bluetooth may be dependent on power and Bluetooth-class, which may be typically of the order of 10-200 feet, for example.

In accordance with another embodiment of the invention, Wi-Fi Direct wireless protocol may be used to provide short-range peer-to-peer connections between mobile devices $108_1 \ldots 108_7$. The Wi-Fi Direct protocol may have a maximum range of over 600 feet and speeds of up to 250 Mbps and may allow a mobile device to advertise itself as a combination of a software access point and a peer. A mobile device with Wi-Fi Direct may have a peer-to-peer connection to another mobile device, while having a wireless LAN connection to an infrastructure network via an access point. The Wi-Fi Direct protocol may provide security with WPA2 encryption and Wi-Fi Protection Setup (WPS) secure key handling.

The ad-hoc networking server, which may be part of a POS device 104, for example, may be used to configure mobile devices $108_1 \ldots 108_7$ to communicate in ad-hoc mode and to use the same wireless network and channel when sharing information with each other.

In operation, a plurality of users of mobile devices $108_1 \ldots 108_7$ may be moving around the shopping mall 102. Although FIG. 1 illustrates pedestrians in a mall, other situations, such as, the users with mobile devices in moving vehicles, may be used without departing from the spirit and scope of the invention. Each of the plurality of mobile devices $108_1 \ldots 108_7$ may be location-aware based on global positioning system (GPS) receivers communicating with one or more satellites $101_1 \ldots 101_4$. The plurality of mobile devices $108_1 \ldots 108_7$ may comprise one or more wireless transceivers that may be operable to communicate with the plurality of cellular towers $112_1$ and $112_2$ and one or more of the plurality of access points $110_1$ and $110_2$. Although two cellular towers are shown in FIG. 1, smaller cellular based base stations, such as femtocells and picocells may be used to improve cellular coverage in indoor areas without limiting the scope of the invention.

Other networks that could be present are Bluetooth, Radio Frequency Identification (RFID), WiMax, UWB, Wi-Fi Direct, and/or 60 GHz wireless protocols. Each type of network may have one or more implementations. For example, the WLAN 802.11 standard (also referred to as Wi-Fi) may include 802.11b, 802.11a, 802.11g, 802.11z, 802.11n and Wi-Fi Direct. The cellular network may include Code Division Multiple Access (CDMA), CDMA2000, Wideband CDMA (WCDMA), Time Division Multiple Access (TDMA), Frequency Division Multiple Access (FDMA), and other multiple access techniques. The users inside the mall 102 may be able to use their mobile devices $108_1 \ldots 108_7$ and Wi-Fi access points in hot spot areas to connect to the Internet. The users with data plans may also use the cellular network to connect to the Internet. A deal advertising company may use its deal server and a network, such as the Internet or an Intranet, to communicate with the computing servers of the stores and the computing devices of its registered members. The deal server may use a location server to estimate the location and velocity of all its members. The deal server may then dynamically generate nearby store discount deals that match subgroups of the members or use existing nearby store deals, and forward relevant deal advertisements to the mobile devices $108_1 \ldots 108_7$ of the members.

Figure 2:
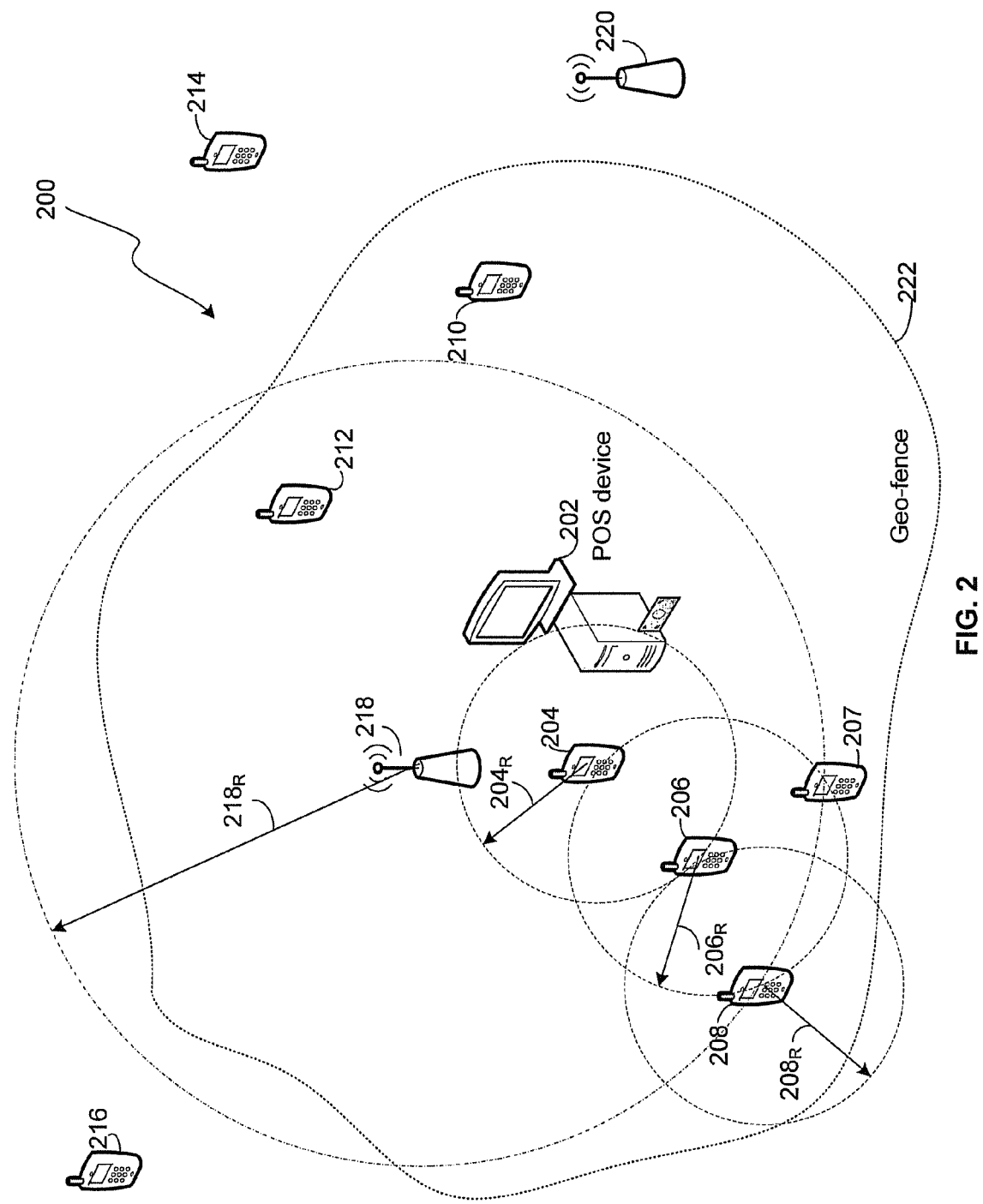
FIG. 2 is a block diagram illustrating communication of location coordinates of a mobile device to a POS device via an exemplary peer-to-peer ad-hoc network, in accordance with an embodiment of the invention.

FIG. 2 is a block diagram illustrating communication of location coordinates of a mobile device to a POS device via an exemplary peer-to-peer ad-hoc network, in accordance with an embodiment of the invention. Referring to FIG. 2, there is shown a peer-to-peer ad-hoc network 200.

The peer-to-peer ad-hoc network 200 may comprise a POS device 202, a defined geo-fence 222 generated around the POS device 202, a plurality of mobile devices 204, 206, 207, 208, 210, 212, 214, and 216, and a plurality of access points 218 and 220. The geo-fence 222 may be a virtually fenced-off geographic location. The generated geo-fence 222 around the POS device 202 may be defined as any regular or irregular polygonal shape and may be dynamically modified. In accordance with an embodiment, the POS device 202 may be enabled to define the geo-fence 222 to include a circle with a defined center and a defined radius on a map, or a rectangular area, or a polygon, for example. The POS device 202 may be operable to allow a user to drag and move the geo-fence 222. Alternatively, the mobile device 212 with positioning capability may be moved around to different locations on the desired geo-fence boundary to define the geo-fence 222, for example. For example, in one embodiment of the invention, the defined geo-fence 222 may indicate a boundary of a store within a shopping mall or a food court, for example. In another embodiment of the invention, the defined geo-fence 222 may indicate a boundary of a particular department within a store or a restaurant, or a building, or a defined outdoor area, for example. In another embodiment, the geo-fence 222 may be a three-dimensional shape that may enclose a volume. For example, a geo-fence for a business that has multiple floor levels may include multiple floors, where there are a plurality of POS devices 202 on each floor and the calculated position of the mobile device 206 may also determine which floor it is on. Some examples of three dimensional geo-fence shapes may include a rectangular prism, triangular prism, pentagonal prism, octagonal prism, polyhedron, pyramids, sphere, cube, and/or a cylinder, for example.

The POS device 202 may comprise suitable logic, circuitry, interfaces, and/or code that may be operable to record and track customer orders, process credit and debit cards, process electronic commerce payment transactions, connect to other systems in a network, purchasing, receiving and transferring of products to and from other locations, and/or manage inventory. In one embodiment of the invention, the POS device 202 may comprise a computer, monitor, cash drawer, receipt printer, customer display, a barcode scanner, a debit and/or credit card reader, and one or more application-specific programs and input/output (I/O) devices for a particular environment in which it may serve. In another embodiment of the invention, the POS device 202 may also comprise a weight scale, a global navigation satellite system (GNSS) device, such as a global positioning system (GPS) device, an integrated credit card processing system, a signature capture device and/or a customer pin pad device. The POS device 202 may use touch-screen technology for ease of use and a computer may be built into its display to liberate counter space for a retailer. The POS device 202 may also use RFID readers for instances where the products use RFID tags instead of barcodes.

The POS device 202 may be operable to handle a myriad of customer based functions, such as, sales, returns, exchanges, layaways, gift cards, gift registries, customer loyalty programs, quantity discounts, pre-planned promotional sales, manufacturer coupon validation, foreign currency handling and multiple payment types. A POS device 202 for a restaurant, for example, may comprise all menu items stored in a database that may be queried for information in a plurality of ways. The POS device 202 may be utilized in various industries that may have a point of sale, such as, a service desk, including restaurants, lodging, entertainment, and museums. The POS device 202 may be web-enabled, and may be operable to remotely process transactions and track inventory across geographically-dispersed locations.

Each of the plurality of access points 218 and 220 and the plurality of mobile devices 204, 206, 208, 210, 212, 214, and 216 may comprise suitable logic, circuitry, interfaces, and/or code that may be operable to communicate utilizing one or more communication protocols. In this regard, the plurality of mobile devices 204, 206, 208, 210, 212, 214, and 216 may each be operable to transmit and/or receive data via Wireless Local Area Network (WLAN), Wi-Fi Direct, RFID, Bluetooth, WiMax, HD Radio, Ultra-wideband (UWB), GPS, cellular, near field communication (NFC), and/or 60 Ghz protocols. Exemplary mobile devices may comprise laptop computers, tablet computers, mobile phones, personal digital assistants, personal media players, gaming devices, image and/or video cameras, for example. The plurality of mobile devices 204, 206, 208, 210, 212, 214, and 216 may be operable to receive, process, and present multimedia content and may additionally be enabled to run a network browser or other applications for providing Internet services to a user of the mobile device. In accordance with an embodiment of the invention, the plurality of mobile devices 204, 206, 208, 210, 212, 214, and 216 may comprise one or more application-specific programs for electronic payment transactions.

In operation, a user of a mobile device, for example, mobile device 208 may enter a store or a defined geo-fence 222 around the POS device 202. The mobile device 208 may be operable to determine its location coordinates based on one or more positioning methods as described in U.S. application Ser. No. 13/422,823, now published as United States Patent Publication 2013-0030931, filed on Mar. 16, 2012, which is hereby incorporated herein by reference in its entirety.

U.S. application Ser. No. 12/852,443 filed Aug. 6, 2010, now issued as U.S. Pat. No. 8,314,736, provides a detailed description of determining the location of a mobile device based on received multipath signals, and is hereby incorporated herein by reference in its entirety.

U.S. application Ser. No. 12/833,938 filed Jul. 9, 2010, now issued as U.S. Pat. No. 8,344,949, provides a detailed description of determining the location of a mobile device based on received signals with known radio transmission patterns, and is hereby incorporated herein by reference in its entirety.

U.S. application Ser. No. 11/940,219 filed Nov. 14, 2007, now issued as U.S. Pat. No. 8,193,978, provides a detailed description of determining the location of a mobile device based on assisted GPS, and is hereby incorporated herein by reference in its entirety.

U.S. application Ser. No. 11/641,624 filed Dec. 18, 2006, now issued as U.S. Pat. No. 8,294,554, provides a detailed description of determining the location of a RFID tag, and is hereby incorporated herein by reference in its entirety.

U.S. application Ser. No. 12/843,868 filed Jul. 6, 2010, now issued as U.S. Pat. No. 8,421,676, provides a detailed description of determination of a location of a mobile device based on measured phase differences and corresponding frequency differences, and is hereby incorporated herein by reference in its entirety.

The mobile device 208 may determine whether it is within a generated geo-fence 222 of the POS device 202 based on its determined location coordinates. In instances where the mobile device 208 is within a generated geo-fence 222 of the POS device 202, a notification may be triggered on the mobile device 208 indicating its presence within the generated geo-fence 222 of the POS device 202. The mobile device 208 may determine whether the POS device 202 is within its range $208_R$ of communication. Since the POS device 202 is not within its range $208_R$ of communication, the mobile device 208 may determine whether another intermediate mobile device 206 or access point in the peer-to-peer ad-hoc network is within its range $208_R$ of communication. In instances where another intermediate mobile device 206 in the peer-to-peer ad-hoc network 200 is within its range $208_R$ of communication, the mobile device 208 may communicate its location coordinates and/or payment transaction information to the intermediate mobile device 206. For example, the mobile device 208 may communicate an authorization to execute a payment transaction when the mobile device 208 is within a generated geo-fence 222 of the POS device 202 and the intermediate mobile device 206 is within a range $208_R$ of communication of the mobile device 208.

The intermediate mobile device 206 may determine whether the POS device 202 is within its range $206_R$ of communication. Since the POS device 202 is not within its range $206_R$ of communication, the intermediate mobile device 206 may communicate the location coordinates of the mobile device 208 and/or received payment transaction information to another intermediate mobile device 204 via the peer-to-peer ad-hoc network 200. For example, the intermediate mobile device 206 may communicate an authorization to execute a payment transaction to the intermediate mobile device 204 when the mobile device 208 is within a generated geo-fence 222 of the POS device 202 and the intermediate mobile device 204 is within a range $206_R$ of communication of the intermediate mobile device 206.

The intermediate mobile device 204 may determine whether the POS device 202 is within its range $204_R$ of communication. Since the POS device 202 is within its range $204_R$ of communication, the intermediate mobile device 204 may communicate the mobile device's 208 location coordinates and/or payment transaction information to the POS device 202 via the peer-to-peer ad-hoc network 200. For example, the intermediate mobile device 204 may communicate an authorization to execute a payment transaction to the POS device 202 when the mobile device 208 is within a generated geo-fence 222 of the POS device 202 and the POS device 202 is within a range $204_R$ of communication of the intermediate mobile device 204.

The user with the mobile device 208 may choose to purchase one or more items within the store or the generated geo-fence 222. When the user with the mobile device 208 is ready to checkout, the mobile device 208 may communicate an authorization via the peer-to-peer ad-hoc network 200 to the POS device 202 to execute a payment transaction based on the one or more items chosen to be purchased when The mobile device 208 may receive an authorization response for the executed payment transaction from the POS device 202 via the peer-to-peer ad-hoc network 200. For example, if the mobile device 208 is within a range of communication of the POS device 202, the mobile device 208 may receive an authorization response for the executed payment transaction directly from the POS device 202. In instances where the mobile device 208 is not within a range of communication of the selected POS device 202, the mobile device 208 may receive an authorization response for the executed payment transaction from the POS device 202 via one or more intermediate mobile devices 204 and 206 and/or access points 218 with a range 218R of communication in the peer-to-peer ad-hoc network 200. In accordance with an embodiment of the invention, the user with the mobile device 208 may be able to execute the payment transaction without physically using or swiping a credit or debit card, or without physically tapping or holding the mobile device 208 near the POS device 202.

In accordance with another embodiment of the invention, a POS device 202 may communicate discounted deal information and referral reward information to the mobile device 204. The mobile device 204 may communicate discounted deal information and referral reward information to the access point 218 and the mobile device 206. The access point 218 may then communicate the discounted deal information and referral reward information to mobile devices 206 and 212 within its range $218_R$ of communication. The mobile device 206 may then communicate the discounted deal information and referral reward information to mobile devices 208 and 207 within its range $206_R$ of communication. In one embodiment of the invention, the intermediate mobile devices may act as networking routers and may forward the personal referral link and message of the POS device 202 to destination users of mobile devices 207 and 208. In the event that a destination user with mobile device 207 or 208 purchases the deal, the POS device 202 may allocate a reward to the original referral source mobile device 204. Multiple sources can each have their personalized referral links and forward the same deal to one destination. If a destination user receives multiple referrals for the same deal, the user can then decide which referral link to use.

In another embodiment of the invention, each intermediate user of mobile devices 204 and 206 may access a deal advertising server in the POS device 202, set up an account if not already registered, receive a personalized referral link and message, and forward to the next user. If the destination user of mobile device 207 and/or 208 purchases the deal, then the POS device 202 may allocate a reward to the last referral source mobile device 206.

In another embodiment of the invention, a portion of the intermediate users with mobile devices 204 and 206 may register with the deal advertising server in the POS device 202 and receive their personalized referral links and messages, while other mobile devices may forward the personalized links and messages they receive. If the destination user of mobile device 207 and/or 208 purchases the deal, then the POS device 202 may allocate a portion of the reward to the last referral source mobile device 206 and allocate a portion of the reward to the original referral source mobile device 204. The intermediate users of mobile devices 204 and 206 that act as routers and forward the personalized referral links and messages of other users are using the resources of their mobile devices, such as battery energy and CPU. These users may not want to receive their own personalized referral links but might demand to be rewarded in some way if they are to allow others to use their mobile devices as routers in an ad-hoc network. In accordance with another embodiment of the invention, the original referrer or user of mobile device 204 may specify a separate shared reward amount for intermediate routers.

In accordance with another embodiment, when a user of a mobile device, for example, mobile device 206, may enter or leave a geo-fence 222, one or more software downloads and upgrades may be downloaded on to the mobile device 206. For example, when mobile device 206 enters the geo-fence 222 of a mall an interactive map of the mall with deal advertisements may be downloaded on to the mobile device 206. In another embodiment, when a user of a mobile device 206 may enter or leave a geo-fence 222, the sound of the mobile device 206 may be turned on or switched off, or a volume of the mobile device 206 may be turned higher or lower. For example, when the mobile device 206 enters the geo-fence 222 of a library or a movie theater, the sound of the mobile device 206 may be turned off. In another embodiment, when a user of a mobile device 206 may enter or leave a geo-fence 222, the mobile device 206 may be powered down or enter a sleep mode or powered up or activated, for example. In another embodiment, calendar reminders may be linked to the location of a geo-fence 222, location-based reminders may be created, a reminder may be sent with an email, SMS, vibration, voice, or facsimile (FAX) when a mobile device 206 enters or leaves the geo-fence 222. For example, when the user enters a shopping mall, a shopping list reminder may be sent to the mobile device 206. In another embodiment, the actions of a user with the mobile device 206 may be monitored and data-mined when they enter or leave a geo-fence 222. For example, when a user enters a geo-fence 222 that marks the boundary of a store, a software or web service may monitor the actions of that user in terms of the amount of time they spend at certain store areas and which products they show the most interest in. This information may then be used to present them with personalized deal advertisements on their mobile device 206, on electronic billboards and displays near them, or send them conventional mail marketing material.

In another embodiment, when a user of a mobile device 206 may enter or leave a geo-fence 222, an email, SMS, vibration, voice, and/or FAX alert may be communicated to the mobile device 206 or to another device such as the mobile device 210. In another embodiment, when a user of a mobile device 206 may enter or leave a geo-fence 222, the user interface and functionality of a location-based application or a game may be changed so that it has a different look and feel with corresponding menus. For example, a location-based R-rated game on the mobile device 206 may switch to the functionality of a less violent home edition when the mobile device 206 enters the geo-fence 222 of the mobile device 206 user's home, and may switch back to the full version once the mobile device 206 leaves the geo-fence 222. In another embodiment, a location-based application may be disabled or enabled when a user of the mobile device 206 enters or leaves the geo-fence 222. For example, a kid may not be able to play games on the mobile device 106 when the mobile device 206 is within a defined geo-fence, such as, a school, a library, and/or a home. In another embodiment, the Internet connectivity of the mobile device 206 may be location-based and may be dynamically modified when inside a geo-fence 222, for example, using Wi-Fi for Internet connectivity within a home or an office, and using a cellular data plan for Internet connectivity outside the geo-fence 222. In another embodiment, the network security settings of a mobile device 206 may be dynamically modified based on the location of the mobile device 206 within or outside the geo-fence 222. For example, for an office or home wireless network, only users inside a geo-fence 222 may be allowed to connect to the network and outside users may be denied access.

In another embodiment, a software application on the mobile device 206 may be location-based and may start running and perform certain functions when the mobile device 206 enters or leaves the geo-fence 222. For example, when a user enters a geo-fence 222 around his/her home, his/her mobile device 206 may send an alert to software applications that run on the mobile device 206 or on a different networked computer. The software applications may then turn on the lights of the house, open the garage door or the front door, turn on the TV, turn on air cooling and/or heating, for example. Similarly, when a user leaves the geo-fence 222 around his/her home, the software applications may receive an alert and turn off the lights, close all the doors, turn off the TV and other appliances, and turn off air cooling and/or heating. In another embodiment, there may be several geo-fence boundaries such as 222 and when the mobile device 206 enters or leaves each boundary, different actions may be triggered. For example, a large geo-fence may extend outside the house for opening and/or closing the garage door and front door, while a smaller geo-fence inside the house's living room may be used for turning the living room lights on/off.

In another embodiment, a first list of phone numbers may be created, and one or more phone numbers listed in the first list may be blocked as incoming voice calls, if the mobile device 206 is within the geo-fence 222. In another embodiment, a second list of phone numbers may be created, and one or more phone numbers listed in the second list may be blocked as incoming voice calls, if the mobile device 206 is outside the geo-fence 222. In another embodiment, a third list of Internet web addresses may be created, and one or more web addresses listed in the third list may be blocked from being accessed, if the mobile device 206 is within the geo-fence 222. In another embodiment, a fourth list of Internet web addresses may be created, and one or more web addresses listed in the fourth list may be blocked from being accessed, if the mobile device 206 is outside the geo-fence 222.

In another embodiment, a user with the mobile device 206 may automatically check-in at a social networking web site, for example, Foursquare or Gowalla and receive award points when the user enters the geo-fence 222 of a particular location. This removes the need for the user to manually check-in to get award points. In another embodiment, a user with a mobile device 206 has to enter the geo-fence 222 associated with a business, for example, a restaurant, a hotel, a bar, or a night club in order to be able to write a review on a rating web site, for example, Yelp or Tripadvisor. The review may be written while the user is inside the geo-fence 222 or at a later time when the user is outside the geo-fence 222.

In another embodiment, users of a ratings web site may filter the rating reviews of a business based on a function of the interaction of the reviewer with the geo-fence 222 associated with the business. The function may vary depending upon factors, such as, has the reviewer ever been inside the geo-fence 222, how many times has the reviewer been inside the geo-fence 222, what times and dates have the reviewer been inside the geo-fence 222. The users of the ratings web site may, for example, filter out or assign a smaller weight to reviews from people who have not been inside the geo-fence 222 of a particular business, but have nonetheless written a review. This allows users of the rating web site to ignore or assign a smaller weight to the reviews from people who have written biased reviews of businesses such as hotels, brick and mortar stores, restaurants, and night clubs without visiting them. Similarly, users of the rating web site may filter out or assign a smaller weight to reviews from people who have spent excessive time inside the geo-fence 222 of a business. This may allow users of the rating web site to filter out or assign a smaller weight to the reviews from people who work for a business and write biased reviews on that business. In another embodiment, users of a ratings web site may filter the rating reviews of a business based on a function of the interaction of the reviewer with the geo-fence 222 associated with the business as well as the geo-fence 222 of related businesses. The geo-fence 222 may not only describe the geography it encloses, but may also have other properties, such as, a business category, for example, a restaurant, a hotel, a bar or a night club. For example, a person who has been inside the geo-fence 222 of many restaurants over a period of time as well as the geo-fence 222 of restaurant X can be considered an experienced reviewer of restaurants and his/her review of restaurant X may be given a higher weighting. In another embodiment, people posting reviews on a rating web site have stored their information with the web site. The information may include home address, age, marital status. Users of the ratings web site can then filter the reviews of others based on complex queries such as interaction of the reviewer with one or more geo-fences 112, their home and/or work address, their demographics, and their current tracked location. For example, users of the rating web site can query the web site to "Show the top five highest rated hotels in Cancun from people who have been inside the geo-fences of the hotels in the past", or "Show the top five highest rated hotels in Cancun from people who have been inside the geo-fences of the hotels in the past and have been inside the geo-fences of at least 10 other hotels in Cancun in the past", or "Show the top five highest rated hotels in Cancun from people who live in California and who have been inside the geo-fences of the hotels in the past", or "Show the top five highest rated hotels in Cancun from people with kids who live in California and who have been inside the geo-fences of the hotels in the past", or "Show the top five highest rated hotels in Cancun from people with kids whose present tracked location is California and who have been inside the geo-fences of the hotels in the past". These query methods can be supplied to users with a simple user interface that has for example multiple checkboxes and fields that allow combining simple queries into more complex queries. It is possible for a person posting a review on the ratings web site to login and post their review with a different computing device than their mobile position tracking device. People posting reviews of businesses on the ratings web site may disable position tracking or not provide it. However, as a result, their reviews may be assigned less weight by the ratings web site or by users of the ratings web site since there is no record of the reviewers being in the geographical proximity of the places they are reviewing.

In another embodiment, a user with the mobile device 206 who enters a geo-fence 222 may receive notifications to inform him/her which of his/her friends are inside the geo-fence 222 area. The notification may be via an email, SMS, vibration, voice, map on the display of the mobile device 206, and/or a FAX alert. Similarly, when a user with the mobile device 206 leaves a geo-fence area 222 he/she may automatically check out and/or send notifications to his/her friends to notify them that he/she is no longer inside the geo-fence 222. In another embodiment, a moving object may be carrying a first position tracking device within the mobile device 206 and when the mobile device 206 enters or leaves a geo-fence 222, a notification may be sent to a second mobile device 210. The notification may be via an email, a SMS, vibration, voice, FAX alert, and/or map on the display of the mobile device 210 with the positions of the mobile device 206, the geo-fence 222, and the mobile device 210. For example, the mobile device 206 may be attached to a child that is being tracked by a parent with the mobile device 210, or the mobile device 206 may be attached to a company vehicle that is being tracked by a supervisor, or the mobile device 206 may be attached to a livestock that is being tracked by a farmer.

Figure 3A:
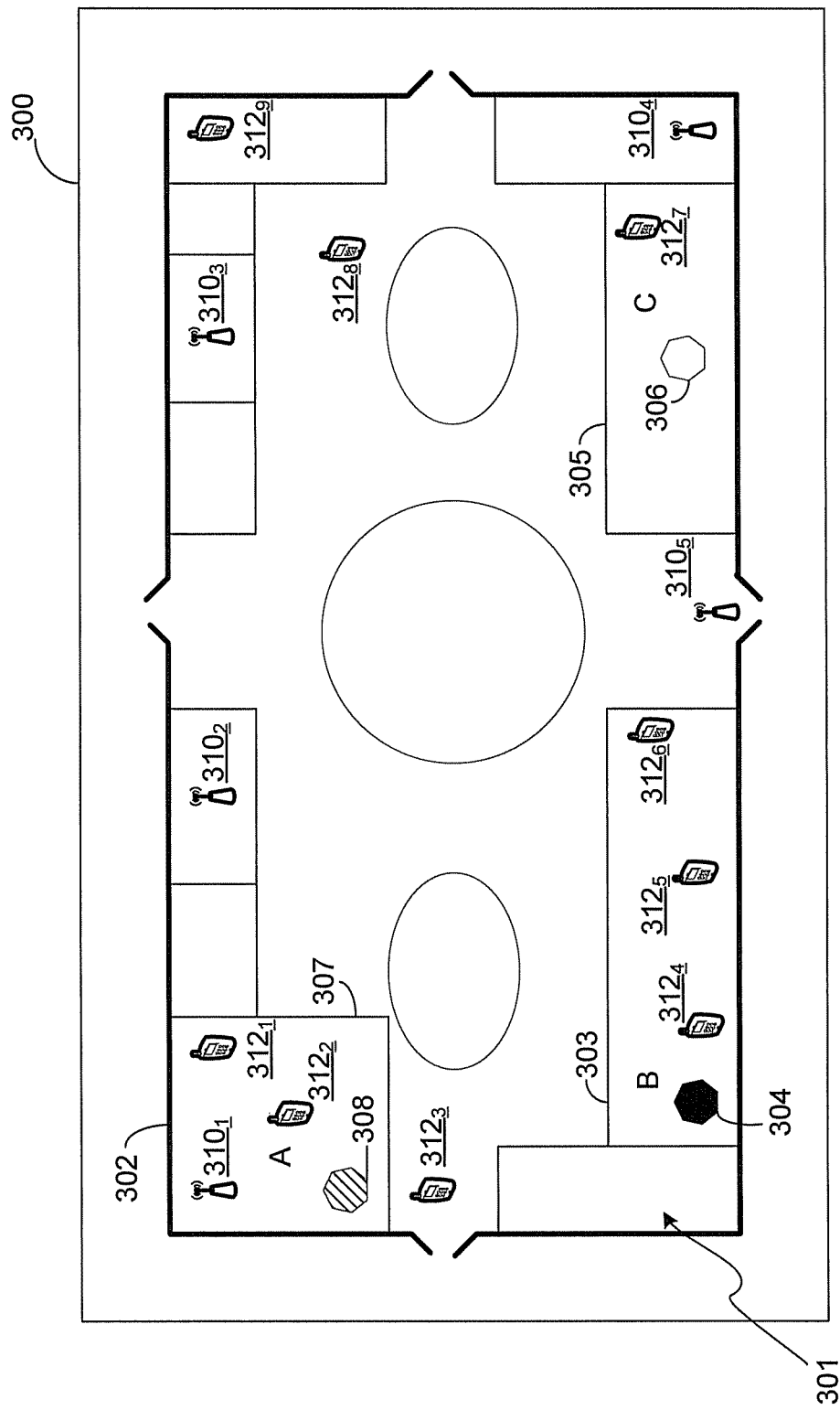
FIG. 3A is a diagram of an exemplary display showing a schematic map indicating defined geo-fences and a location of one or more mobile devices within the defined geo-fences, in accordance with an embodiment of the invention.

FIG. 3A is a diagram of an exemplary display showing a schematic map indicating defined geo-fences and a location of one or more mobile devices within the defined geo-fences, in accordance with an embodiment of the invention. Referring to FIG. 3A, there is shown a display 300. The display 300 may be a display of the POS device 202 or may be a display of one of the mobile devices 208, for example.

The display 300 may indicate a map 302 of a store, a shopping mall, or a restaurant, for example. The map 302 may indicate a peer-to-peer ad-hoc network 301 comprising a plurality of POS devices 304, 306, and 308, and one or more corresponding defined geo-fences 303, 305 and 307 around the POS devices 304, 306, and 308 respectively, which may represent individual stores in a shopping mall or restaurants in a food court, for example. The display 300 may indicate a location of one or more access points $310_1 \ldots 310_5$, and one or more mobile devices $312_1 \ldots 312_9$. The display 300 may also indicate a speed of movement and a direction of movement of the plurality of mobile devices $312_1 \ldots 312_9$ at the selected plurality of POS devices 304, 306, and 308. Accordingly, staff may be assigned to designated sections of a store or stores in a mall based on the indicated speed of movement and the direction of movement of the plurality of mobile devices $312_1 \ldots 312_9$ at the selected plurality of POS devices 304, 306, and 308. The staff at the POS devices 304, 306, and 308 may also correlate the speed and/or direction and identifying information of users of mobile devices $312_1 \ldots 312_9$ on the map 302 with their own visual sight of the people in their vicinity and use that information when they interact with the users of the mobile devices. The store advertising displays may also use the speed and direction information, where displays that are facing a user with a mobile device and are about to come into his/her range of view are activated and present customized information and advertisement to the user.

A POS device, for example, POS device 304 may determine whether a selected mobile device $312_6$, for example, is within a generated geo-fence 303 of the POS device 304. In instances where the selected mobile device $312_6$ is within a generated geo-fence 303 of the POS device 304, a notification may be triggered on the display 300 of the POS device 304 indicating the presence of the selected mobile device $312_6$ within the generated geo-fence 303 of the POS device 304. The POS device 304 may determine whether the selected mobile device $312_6$ is within its range of communication. In instances where the selected mobile device $312_6$ is within a range of communication of the POS device 304, the POS device 304 may communicate advertisement, discounted deal and/or payment transaction information to the selected mobile device $312_6$ directly or via the peer-to-peer ad-hoc network 301. The POS device 304 may be operable to store the user's past purchases with the store or restaurant, credit and/or debit card authorizations associated with the user, returns, exchanges, layaways, gift cards, gift registries, and/or customer loyalty programs associated with the user. For example, the POS device 304 may communicate advertisement information and/or discounted deal information for one or more items recently purchased by the user of the mobile device $312_6$ when the selected mobile device $312_6$ is within a generated geo-fence 303 of the POS device 304 and the selected mobile device $312_6$ is within a range of communication of the POS device 304.

In instances where the selected mobile device $312_6$ is not within a range of communication of the POS device 304, the POS device 304 may determine whether another intermediate mobile device $312_4$ in the peer-to-peer ad-hoc network 301 is within its range of communication. The POS device 304 may communicate advertisement, discounted deal, referral reward, and/or payment transaction information to the intermediate mobile device $312_4$ in the peer-to-peer ad-hoc network 301. For example, the POS device 304 may communicate advertisement information and discounted deal information for one or more items recently purchased by the user of the mobile device $312_6$ to the intermediate mobile device $312_4$ when the mobile device $312_6$ is within a generated geo-fence 303 of the POS device 304 and the intermediate mobile device $312_4$ is within a range of communication of the POS device 304. The POS device 304 may also communicate referral reward information to the intermediate mobile device $312_4$.

The intermediate mobile device $312_4$ may determine whether the selected mobile device $312_6$ is within its range of communication. In instances where the selected mobile device $312_6$ is not within a range of communication of the intermediate mobile device $312_4$, the intermediate mobile device $312_4$ may communicate advertisement, discounted deal, referral reward, and/or payment transaction information to another intermediate mobile device $312_5$ via the peer-to-peer ad-hoc network 301. For example, the intermediate mobile device $312_4$ may communicate advertisement information and discounted deal information for one or more items recently purchased by the user of the mobile device $312_6$ to the intermediate mobile device $312_5$ when the selected mobile device $312_6$ is within a generated geo-fence 303 of the POS device 304 and the intermediate mobile device $312_5$ is within a range of communication of the intermediate mobile device $312_4$. The intermediate mobile device $312_4$ may also communicate referral reward information to the intermediate mobile device $312_5$.

In instances where the mobile device $312_6$ is within a range of communication of the intermediate mobile device $312_5$, the intermediate mobile device $312_5$ may communicate advertisement, discounted deal and/or payment transaction information to the selected mobile device $312_6$ via the peer-to-peer ad-hoc network 301. For example, the intermediate mobile device $312_5$ may communicate advertisement information and discounted deal information for one or more items recently purchased by the user of the mobile device $312_6$ to the selected mobile device $312_6$, when the selected mobile device $312_6$ is within a generated geo-fence 303 of the POS device 304 and the selected mobile device $312_6$ is within a range of communication of the intermediate mobile device $312_5$.

The user with the mobile device $312_6$ may choose to purchase one or more items within the store or the generated geo-fence 222. When the user with the mobile device $312_6$ is ready to checkout, the mobile device $312_6$ may communicate an authorization via the peer-to-peer ad-hoc network 301 to the POS device 304 to execute a payment transaction based on the one or more items chosen to be purchased when the mobile device $312_6$ is within the defined geo-fence 303. The POS device 304 may authenticate the received payment transaction information from the mobile device $312_6$. For example, the POS device 304 may authenticate the received payment transaction information from the selected mobile device $312_6$ based on one or more of a voice recognition, a gesture, a computer face recognition and/or a biometric recognition, for example.

In accordance with another embodiment, the POS device 304 may comprise a video camera to record the transaction. A user of the mobile device $312_6$ may give the authorization, for example, the user may say "Put it on my account" which may be video recorded by the POS device 304 and stored in a database to later resolve any potential disputes of a transaction. In another embodiment, the POS device 304 may comprise a biometrics input device to record the transaction. A user of the mobile device $312_6$ may give the authorization, for example, via a biometric scan, which may be stored in a database to later resolve any potential disputes of a transaction.

The POS device 304 may communicate an authorization response or acknowledgement for the executed payment transaction to the mobile device $312_6$ via the peer-to-peer ad-hoc network 301. For example, if the selected mobile device $312_1$ is within a range of communication of the POS device 308, the POS device 308 may communicate an authorization response for the executed payment transaction directly to the selected mobile device $312_1$. In instances where the selected mobile device $312_1$ is not within a range of communication of the POS device 308, the POS device 308 may communicate an authorization response for the executed payment transaction to the selected mobile device $312_1$ via one or more intermediate mobile devices $312_2$ and/or access points $310_1$ in the peer-to-peer ad-hoc network 301.

In accordance with another embodiment of the invention, a POS device 308 may be operable to determine the location coordinates of a mobile device $312_1$ within a 10 meter radius, for example. Accordingly, the POS device 308 may authenticate the received payment transaction information from the mobile device $312_1$ only when the mobile device $312_1$ is within a particular defined geo-fence 307. In other words, the POS device 308 may not authenticate the received payment transaction information from the mobile device $312_1$ when the mobile device $312_1$ is outside the defined geo-fence 307 or within a neighboring store or defined geo-fence 303, for example. In another embodiment of the invention, the mobile device $312_1$ may preset its settings to selectively trigger an authorization to execute the payment transaction when the mobile device $312_1$ is within a defined geo-fence 307, and may choose not to trigger an authorization response to execute the payment transaction when the mobile device $312_1$ is outside the defined geo-fence 307 or within a neighboring store or defined geo-fence 303.

In another embodiment of the invention, the mobile device $312_1$ may also choose to purchase one or more items from a neighboring store or defined geo-fence 305. Accordingly, the POS device 306 in the neighboring geo-fence 305 may be operable to store the user's past purchases with the store, credit and/or debit card authorizations associated with the user, returns, exchanges, layaways, gift cards, gift registries, and/or customer loyalty programs associated with the user. The mobile device $312_1$ may preset its settings to selectively trigger an authorization to execute the payment transaction when the mobile device $312_1$ is within the defined geo-fence 305

In accordance with another embodiment of the invention, a POS device 308 may notify one or more members in the shopping mall 102 about a deal 1 advertisement from store A with a defined geo-fence 307. The POS device 308 may also use one or more of the access points $310_1 \ldots 310_5$ to broadcast the deal to nearby mobile devices that are within its transmission range. This deal may be dynamically generated by contacting store A, or it could be a pre-existing store A deal. In both cases the POS device 308 may use the users' locations and profiles in determining a match between the deal and the members. Different members may receive advertisements about different deals based on their location, purchase history, referral history, wish-lists and other profiles. In this example, mobile devices $312_1$ and $312_2$ may receive an advertisement about the deal from store A because they are potential buyers of the advertisement and/or because they are potential referrers to other shoppers. The users with mobile devices $312_1$ and $312_2$ may then have the option to purchase the deal, and/or use ad-hoc social networking to advertise the deal to near-by shoppers with mobile devices $312_3 \ldots 312_9$. For example, mobile device $312_7$ may not receive the advertisement from the POS device 308 because its user's profile or location (too distant from store A) may not match the advertisement. Some registered members may also not receive advertisements because they do not have network connectivity or because they have disabled position tracking and the POS device 308 may not know their location. In some cases, other users may also receive advertisements either directly from the POS device 308 or through member referrals with standard networking infrastructure and communication servers (email, chat, text message, a shopping portal web site, conventional server-based social networking).

In accordance with an embodiment of the invention, if there are multiple deals from one or more stores a member may receive one advertisement for all the deals that includes a graphical dynamic map 302 with the location of all nearby deals, or separate advertisements for each deal. The users of the mobile devices may be using a software program to view discount deals as they move around the shopping mall 102. This software may be code running on a browser, or it could be a mobile device application that is running a session with a deal advertising server in the POS device 304. The user may be authenticated with the POS device 304 and may view personalized deal advertisements. A map server in the POS device 304 may use the position and velocity information of the user and its map database to generate a dynamic map 302. The user's position may be illustrated on the map 302 with different methods, such as color coding or a circle with a radius that increases with position uncertainty. The map 302 may display the member's name, position, travel direction, and provide directions to the deal of interest. The speed of the user may be conveyed with different methods such as the length of a direction arrow or numerical overlays on the map 302. The map 302 may also display nearby stores and nearby deals. In one embodiment of the invention, deal 1 which is the nearest deal at store A may be featured. The featured deal may have a description of the deal that states the cost to the user and the savings of the deal compared to a regular price. The deal conditions may also be noted such as the duration of the deal, number of items available, required minimum number of items requested by buyers to activate the deal, and the discount function. A member may filter the deals or select a particular one and receive directions to the store and also directions inside the store to get to the deal item.

In a deal-server centric approach, a buyer can select the quantity of the desired item, if applicable, and express interest in purchasing the deal. The deal advertising server in the POS device 304 may check to determine whether the deal conditions are met. Deal conditions may include, for example, if a minimum required number of buyers have expressed interest, if the item is still available, and if the potential buyer qualifies for the deal (e.g. minimum age requirement). If the deal conditions are met then the transaction server in the POS device 304 may charge the buyer and credit the store in exchange for a transaction fee (if multiple stores are involved it credits different amounts to each store). The POS device 304 may communicate an electronic receipt to the mobile device $312_6$ of the buyer. The buyer may then visit the store, show the electronic receipt, and receive the item. The buyer may also request shipment of the item to a shipping address and not even visit the store.

In an exemplary embodiment of the invention, if a user with mobile device $312_2$ buys a gift card from the POS device 308, the user can visit the store to pick store items and use the electronic receipt. Once the user is at the store, the user can use the mobile device $312_2$ to scan and price items. For example, the mobile device $312_2$ can use its camera or a scanner to scan the barcodes of items. Alternatively, if the items have RF tags with price information, the user can use her mobile device $312_2$ with an RF tag reader to scan the prices. After the user has picked the store items, the user can use the Near Field Communication (NFC) component of her mobile device $312_2$, which acts as a smart card, to communicate with a store reader and exchange the gift card receipt for the items. If the items cost more than the gift card she can pay the additional amount with a mobile device NFC card payment method, for example.

In accordance with another embodiment of the invention, a POS device 304 may be operable to define multiple geo-fences and each geo-fence may cover different areas for different applications. For example, the geo-fence for a location-based hands-free payment may be inside the store or geo-fence 303 and a small distance or radius from the POS device 304, while the geo-fence for sending deal advertisements may cover a larger distance and even include locations outside the store, for example, the stores and areas disclosed in map 302. Notwithstanding, a store may have multiple POS devices. A deal advertisement may be sent from the store's server rather than a particular POS device within the store, for example.

In accordance with another embodiment of the invention, the users of mobile devices may use their mobile device $312_6$ to browse products of nearby merchants, make a reservation and/or place an order, and then when they are near a merchant's POS device 304, may complete the transaction. The geo-fence for placing an order may be different, for example, the stores and areas disclosed in map 302, compared to the geo-fence 303 for proximity to the POS device 304 and completion of the transaction.

Figure 3B:
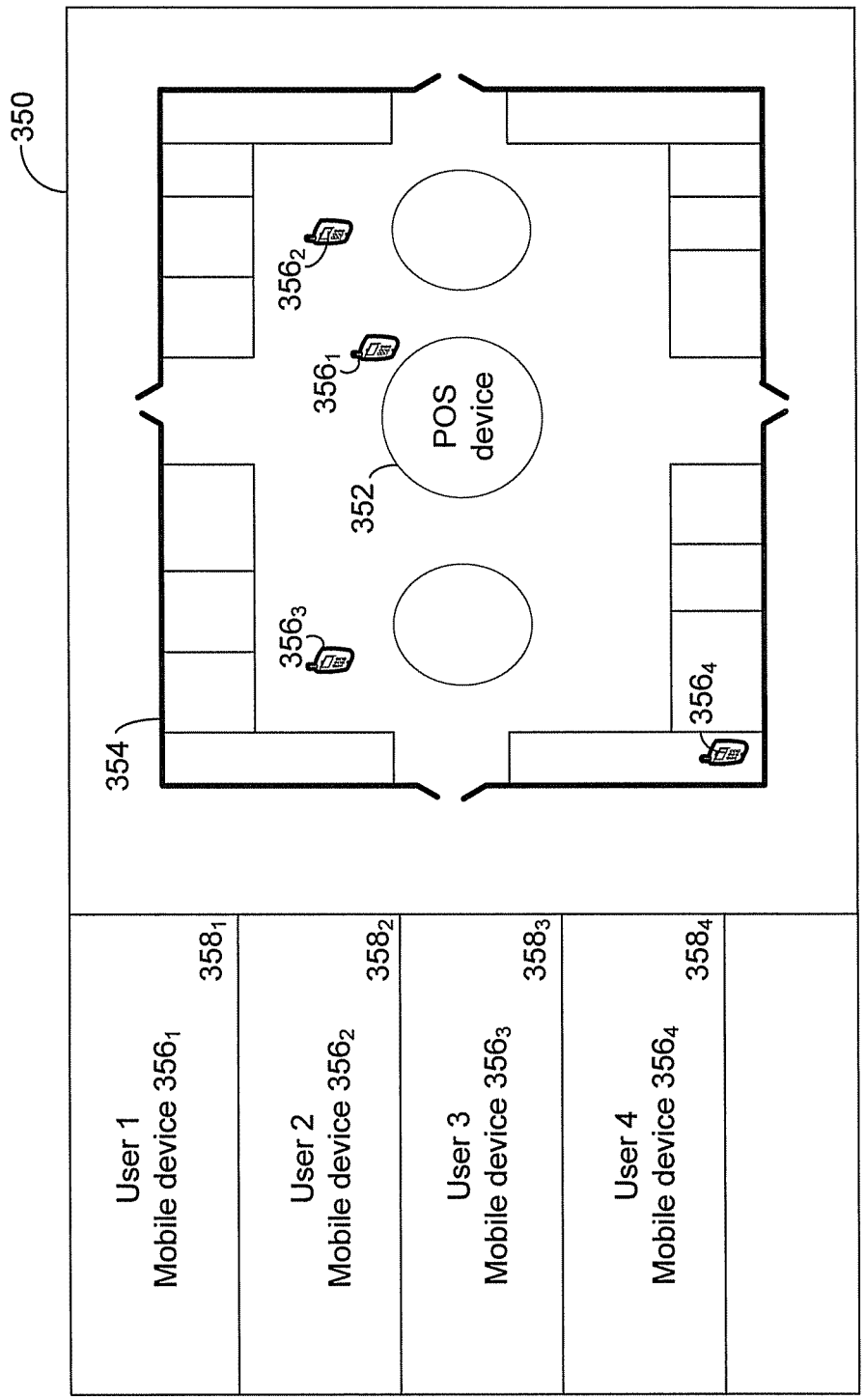
FIG. 3B is a diagram of another exemplary display indicating a location of one or more registered mobile devices on a schematic map, in accordance with an embodiment of the invention.

FIG. 3B is a diagram of another exemplary display indicating a location of one or more registered mobile devices on a schematic map, in accordance with an embodiment of the invention. Referring to FIG. 3B, there is shown a display 350. The display 350 may be a display of the POS device 352.

The display 350 may indicate a POS device 352 and its associated geo-fence 354 of a store, a shopping mall, or a restaurant, for example. The display 350 may indicate a location of one or more mobile devices $356_1 \ldots 356_4$ within the defined geo-fence 354. The display 350 may indicate a plurality of registered users with corresponding mobile devices within the geo-fence 354 in a column on one side of the display. For example, the display 350 may indicate the name, photograph, or other identification of users with mobile devices $356_1 \ldots 356_4$ as tabs $358_1 \ldots 358_4$ respectively. The tabs $358_1 \ldots 358_4$ may be ordered according to a distance of the registered users to the POS device 352. The ordering of the tabs $358_1 \ldots 358_4$ may be updated as the registered users move closer or further away from the POS device 352.

The users of the mobile devices $356_1 \ldots 356_4$ may be registered either with a third party server or with the POS device 200 of a store. The registration of a user may include providing user identification credential information, and payment information, such as credit card information, or other forms of payment information, for example. Once a user is inside the geo-fence 354, the information that is transmitted from the mobile device $356_1$ to the POS device 352 to complete a transaction may not include their payment method details.

The operator of the POS device 352 may be able to zoom in and out of the geo-fence 354 and may select one or more users by clicking that user on the display 350 or clicking a mouse with its pointer on that user in the display 350, for example. When the POS device 352 selects a user on the display 350, the user's details in the column display may also be highlighted. In an alternative embodiment, when the POS device 352 selects a user by clicking on one of the tabs $358_1 \ldots 358_4$, the selected user's location on the display 350 within the geo-fence 354 may be highlighted.

Figure 4:
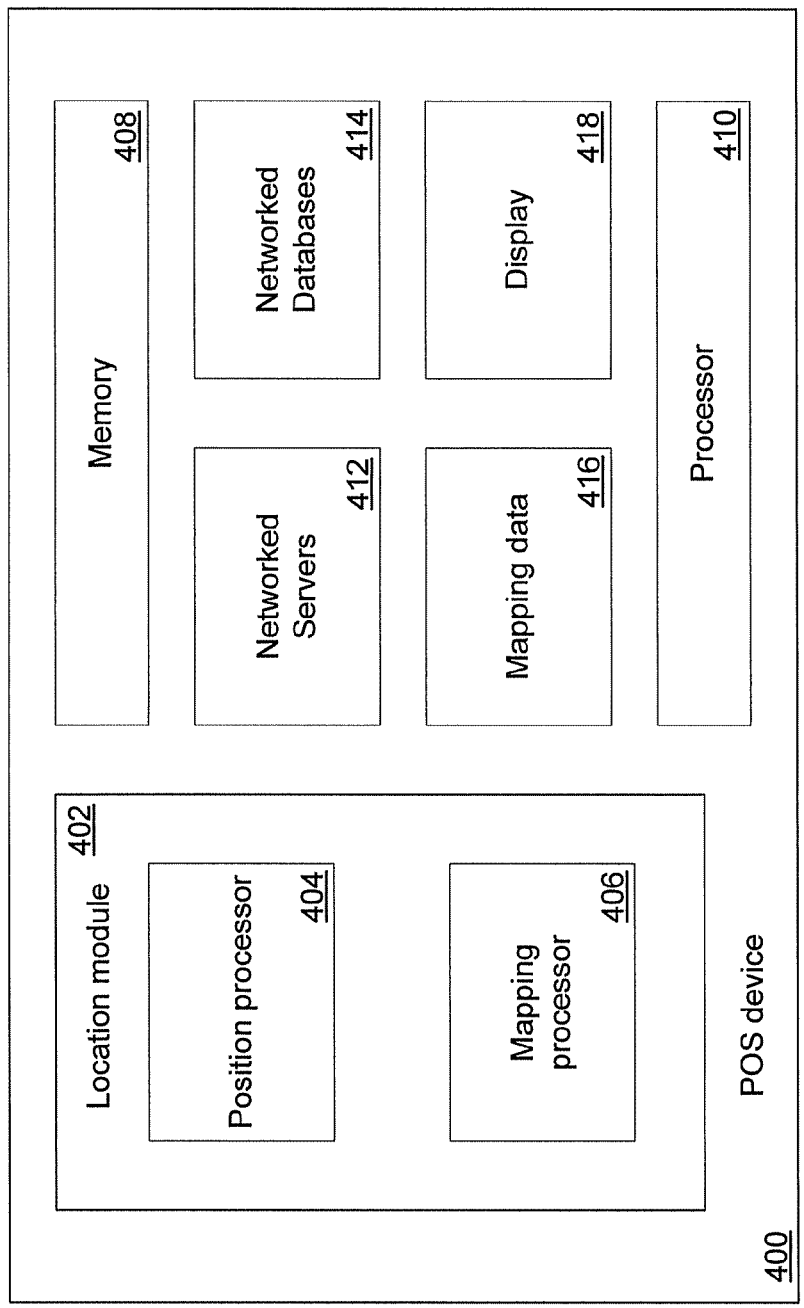
FIG. 4 is a block diagram of an exemplary POS device, in accordance with an embodiment of the invention.

FIG. 4 is a block diagram of an exemplary POS device, in accordance with an embodiment of the invention. Referring to FIG. 4, there is shown a POS device 400. The POS device 400 may comprise a location module 402, a processor 410, a memory 408, a plurality of networked servers 412, a plurality of networked databases 414, mapping data 416, and a display 418.

The location module 402 may be operable to determine the location coordinates of the POS device 400 and/or one or more mobile devices, for example, mobile device 208. The location coordinates may be determined in Cartesian coordinates, latitude and longitude coordinates and altitude for a 3D position, and polar coordinates. The location module 402 may comprise a position processor 404 and a mapping processor 406.

Notwithstanding, the invention may not be so limited, and the signaling and position calculations of the mobile devices 204-216 may be controlled by a remote networked server, for example. The plurality of the mobile devices 204-216 may be operable to communicate their determined location coordinates to a remote networked server, for example, a server at the social networking site Foursquare. The remote networked server may then provide the position and map results to the POS device 400 without limiting the scope of the invention.

The location module 402 may receive measured position parameters and positions of the systems where the position parameters were measured. The location module 402 may be operable to determine the position of the mobile device 208 based on one or more positioning methods as described in U.S. application Ser. No. 13/422,823, now published as United States Patent Publication 2013-0030931 filed on Mar. 16, 2012, which is hereby incorporated herein by reference in its entirety. The location module 402 may comprise a position processor 404 that may be operable to determine the raw location parameters that provide the position of a RFID tag in the mobile device 208, for example. For example, the raw location parameters may represent the position of the RFID tag as longitude, latitude, altitude, in Cartesian coordinates, polar coordinates, such as, distances and angles, or as vectors, for example.

The location module 402 may comprise a mapping processor 406 that may be operable to receive the raw location parameters and mapping data, and transform the raw location parameters into mapping position information. The mapping data 416 may be used to transform the RFID tag's position from Cartesian coordinates or vector representations, for example, into mapped position information, such as, shelf locations, aisles, rooms, warehouses, hallways, or streets. The mapping software components may receive mapping data that maps raw position parameters into mapped position information. The mapping data 416 may further comprise images or maps that may be displayed to a user with the RFID tag superimposed on the image. The mapping data 416 may include information for translating raw location parameters into mapped position information, images, or information for translating between RFID tag IDs and the names of items to which the RFID tags are attached. In other embodiments of the invention, some or all of this information may be received from an external source system such as the POS device 400, for example. In other embodiments of the invention, mapping data may be stored on the RFID tag itself. The mapping data 416 may further include navigation information for providing directions to the user based on the user's current location and the location of a RFID tag.

The processor 410 may comprise suitable logic, circuitry, interfaces, and/or code that may be operable to manage the operations of the POS device 400. For example, the processor 410 may instruct one of a plurality of RFID readers to generate RF signals to a mobile device and receive backscattered signals from the mobile device to determine the location of the mobile device. The memory 408 may be operable to store the location coordinates of the plurality of RFID readers, for example.

The networked servers 412 may comprise a plurality of servers, for example, a deal advertising server, an ad-hoc social networking server, an information server, and a communication and content server, for example. A deal advertising server, for example, may be an agent between different stores and its members and may dynamically generate deals or targets for existing coupon deals from the stores to the mobile devices $108_1 \ldots 108_7$ of the members. The deal advertising server may have access to a number of other networked servers such as a map server, a location server, a data mining server, and a deal transaction server. The servers may perform different functions and may be separate processes that may run on separate computers, or a single computer. These servers may access a group of databases that contain information about store profiles, deal rules, and products. The databases may also contain information about members such as their profiles, location history, usage history, referral history, orders, and shopping or wish-lists.

An ad-hoc social networking server, for example, may provide an ad-hoc social networking application for the mobile devices $108_1 \ldots 108_7$ of all users. This application may allow the users to use their mobile devices $108_1 \ldots 108_7$ and communicate directly without an access point. Users may build spontaneous social networks with other users in their immediate area and advertise to each other. A user may be a shopper that is looking for coupon advertisements, and a seller that is selling advertisements through referrals, or both.

The networked databases 414 may comprise a plurality of databases, for example, a member profile database, a member location database, a member usage database, a member referral database, a member order database, a member wish-list database, a product database, and a store profile and rule database.

The member profile database may comprise member registration identification information, such as, names, billing addresses, payment methods, home address, work street address, email, instant message ID, and/or phone number, as well as demographics and interests. A member may use his/her mobile device or other computing device at home or work to update this information. The data mining server may also analyze the usage and order history of a member to update the member profile information. The data mining server may also be able to access the databases of the networked communication servers in order to update the member profile information. The member location database may comprise the member's position and velocity at different time instances, and the default home or work locations. A location server may poll the member's mobile device or the member's mobile device may broadcast its position and velocity. If the mobile device pushes its position information, then two or more position values at consecutive time instances may be used to estimate velocity. The member usage database may comprise a log of member interactions with the advertising server, such as its discount deal web pages and messages.

The member referral database may comprise a log of a member's referral history. The referral history may include the average number of referrals by each member, total number of referrals for each member, the conversion rate of those referrals to purchases, and the dollar amount of the resulting purchases. Members with a high referral history may be valuable advertising members and may receive notifications about more deals, many of which they may not be interested in but may refer to other shoppers in return for rewards. The member order database may comprise previous purchases of a member and current subscribed deals or orders. The member wish-list database comprises a wish-list and/or shopping list of items registered by the members with the deal advertising server. The product database may comprise information, such as, a product ID, a product category and a subcategory, a product name, a product description, a product manufacturer, a product barcode, and product photos, for example. A store may use its POS device or server computer and a network to communicate with the deal advertising server and update its information. The store profile and rule database may comprise information about each store, such as location, products, discount items, and discount rules. A store may use its POS device or its server computer and a network to communicate with the advertising server and update its information.

A financial transactions database may store a user's past purchases with the store or restaurant, credit and/or debit card authorizations associated with the user, returns, exchanges, layaways, gift cards, gift registries, and/or customer loyalty programs associated with the user. The POS device 400 may trigger an authorization to execute a payment transaction for the one or more items to be purchased when the mobile device 208 is within the defined geo-fence 222.

The display 418 may indicate a map of a store, a shopping mall, or a restaurant, for example. The map may indicate a plurality of POS devices, and one or more corresponding defined geo-fences around the POS devices respectively, which may represent individual stores in a shopping mall or restaurants in a food court, for example. The display 418 may indicate a location of one or more mobile devices within the defined geo-fences. The display 418 may also indicate a speed of movement and a direction of movement of the plurality of mobile devices at the selected plurality of point of sale devices.

Figure 5:
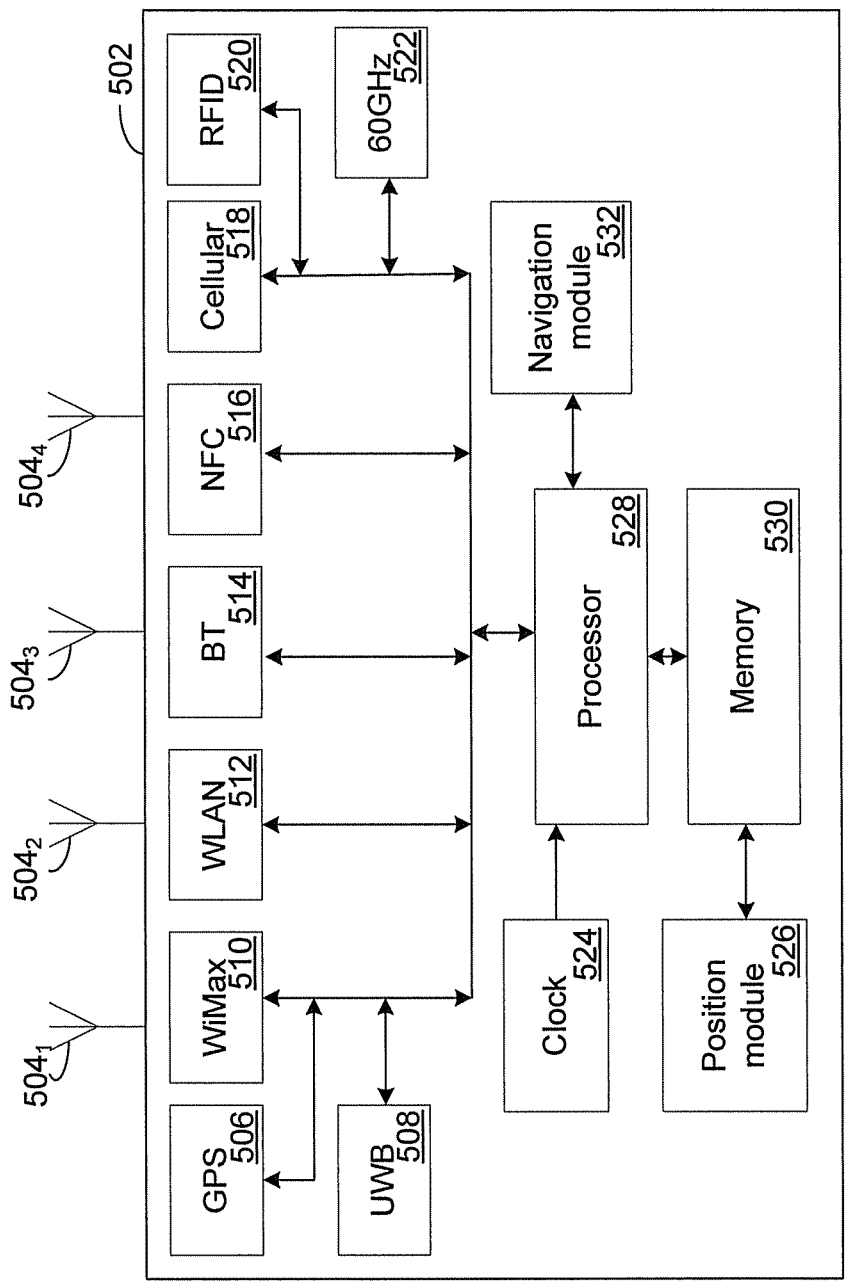
FIG. 5 is an exemplary block diagram of an exemplary mobile device, in accordance with an embodiment of the invention.

FIG. 5 is a block diagram of an exemplary mobile device, in accordance with an embodiment of the invention. Referring to FIG. 5, there is shown a mobile device 502.

The mobile device 502 may comprise a plurality of radios and antennas $504_1 \ldots 504_4$ to receive and transmit signals associated with the one or more radios. For example, the mobile device 502 may comprise a GPS radio 506, a UWB radio 508, a WiMax radio 510, a WLAN radio 512, a Bluetooth radio 514, a NFC radio 516, a cellular radio 518, a RFID reader 520, and a 60 GHz radio 522. Notwithstanding, the invention may not be so limited and other radios capable of transmitting and receiving signals using one or more other protocols may be utilized without limiting the scope of the invention. Furthermore, the mobile device 502 may comprise a subset of the listed radios in FIG. 5 without limiting the scope of the invention.

The mobile device 502 may further comprise a clock 524, a position module 526, a processor 528, a memory 530, and a navigation module 532. The mobile device 502 may be operable to be used about a geographical area of interest. For instance, the mobile device 502 may be within a vehicle, such as, a passenger car or a commercial truck equipped with radios to receive signals and can move to locations within a geographical area of interest. In indoor environments, a mobile device 502 may be carried by a user. In some embodiments of the invention, the mobile device 502 may be a portable wireless device, a consumer hand-held wireless device, a GPS-enabled media player, or a GPS-enabled laptop, for example.

The plurality of radios 506-522 in the mobile device 502 may be Multiple-Input Multiple-Output (MIMO) systems that have multiple antennas, which transmit independently and accordingly improve the accuracy by providing more channel characteristics or parameters. The NFC radio 516 may be operable to read barcodes, smart cards, and interface with electronic payment systems. A GPS is a CDMA system that uses Pseudo Noise (PN) codes with embedded data that provide satellite locations and times. The GPS radio 506 may be of commercial quality in some embodiments and may be used to characterize the GPS communication channel. In some embodiments of the invention, the GPS radio 506 may also provide position values for all other radio communication channel readings.

The processor 528 may comprise suitable logic, circuitry, interfaces, and/or code that may be operable to manage the operations of the plurality of radios 506-522. For example, the processor 528 may instruct one of the plurality of radios 506-522 to scan for a particular signal and perform a channel measurement on a particular frequency with a particular fast Fourier transform (FFT) size and measurement time. The particular radio, for example, WLAN radio 512 may process the received signals to characterize the communication channel of that radio. The processor 528 may then transfer the channel parameters in an appropriate format into local memory 530. The configuration of most of the wireless networks may not change with time since the signal sources, such as cell towers or permanent wireless access points do not move. However, some networks change with time because the signal sources move, such as, GPS satellites make complete orbits of the earth every 24 hours. For those channels that exhibit a time varying dimension, the channels are characterized at different time instances. The clock 524 may be used to time stamp the channel parameters that are stored in the local memory 530. In some embodiments of the invention, the clock 524 may be obtained from a cellular tower, clocks of GPS satellites, or other external sources.

The memory 530 may comprise a ROM for program storage and a RAM for running programs. The operating system interfaces the hardware with the user and manages resources. Input devices of the mobile device 502 may include keyboard and/or touch screen, microphone, and a camera photo-sensor for still pictures and video. Output devices of the mobile device 502 may comprise a display, a speaker, and wired or wireless headsets. The mobile device 502 may have a number of dedicated applications such as deal advertising, ad-hoc social networking, profile editor and matcher, server-based social networking, email, instant messenger, chat, SMS, and/or camera. The mobile device 502 may have a browser that can browse information on the intranet/Internet and download other applications from the network. A bus may link all these components with the processor 528 and memory 530.

The mobile device 502 may also comprise a magnetometer sensor that may provide the orientation of the mobile device 502 in three dimensions to tag the content with 3D orientation information, and an accelerometer that may calculate the velocity magnitude and angle to tag the content with current velocity and velocity angle. The mobile device 502 may comprise one or more applications that may use the position module 526 to tag generated content with location information. The position module 526 may provide latitude and longitude information or some other coordinate system. The position module 526 may also convert the latitude/longitude information to street addresses for maps. The location coordinates, 3D orientation, velocity, and data/time information may be included in the generated content, coded in the filename of the content, or stored and sent in a separate metafile or message that is associated with the content. The content generated by applications such as email, chat, SMS, social networking tools, and/or a camera may be complemented with location, orientation, velocity, and date/time information, if the user/member chooses to do so by setting the appropriate security preferences at the content level or at the application level. The mobile device 502 may upload the geo-tagged content for storage on networked geo-tagged user content databases. Some of the user security preferences may be stored locally on the mobile device 502, while others may be stored on user/member profile databases that are accessible to networked servers that provide applications (e.g. email, chat, social networking). If a member has disabled continuous position tracking but has enabled content tagging, then the uploaded geo-tagged content may be used to extract position and velocity information.

In accordance with an embodiment of the invention, the mobile device 502 may retrieve a first set of parameters from a reference database in the POS device 202 corresponding to a plurality of signals received at the current location coordinates of the mobile device 502. The reference database in the POS device 202 may store channel parameters corresponding to the plurality of signals received at each of a plurality of location coordinates of the plurality of mobile devices in the network. The mobile device 502 may determine its location coordinates based on comparing the retrieved first set of parameters with the stored parameters in the reference database. The retrieved first set of parameters and the stored parameters in the reference database may comprise one or more of a time of arrival (TOA) delay extracted using received signal strength indicator (RSSI) transition, a time of arrival delay extracted using signal preamble correlation, a time difference of arrival (TDOA), a transmitted signal strength, an angle of arrival (AOA), equalizer filter coefficients, channel multipath profile, channel fast Fourier transform (FFT) coefficients, beacon signal strength, phase of each pilot tone, amplitude of each pilot tone and/or Doppler shift associated with movement of the plurality of mobile devices, for example, mobile device 502.

The navigation module 532 may be operable to utilize the determined location coordinates of the mobile device 502 for navigation purposes. For example, the navigation module 532 may indicate the location of the mobile device 502 on a map 302 and track the speed and direction of movement of the mobile device 502.

Figure 6A:
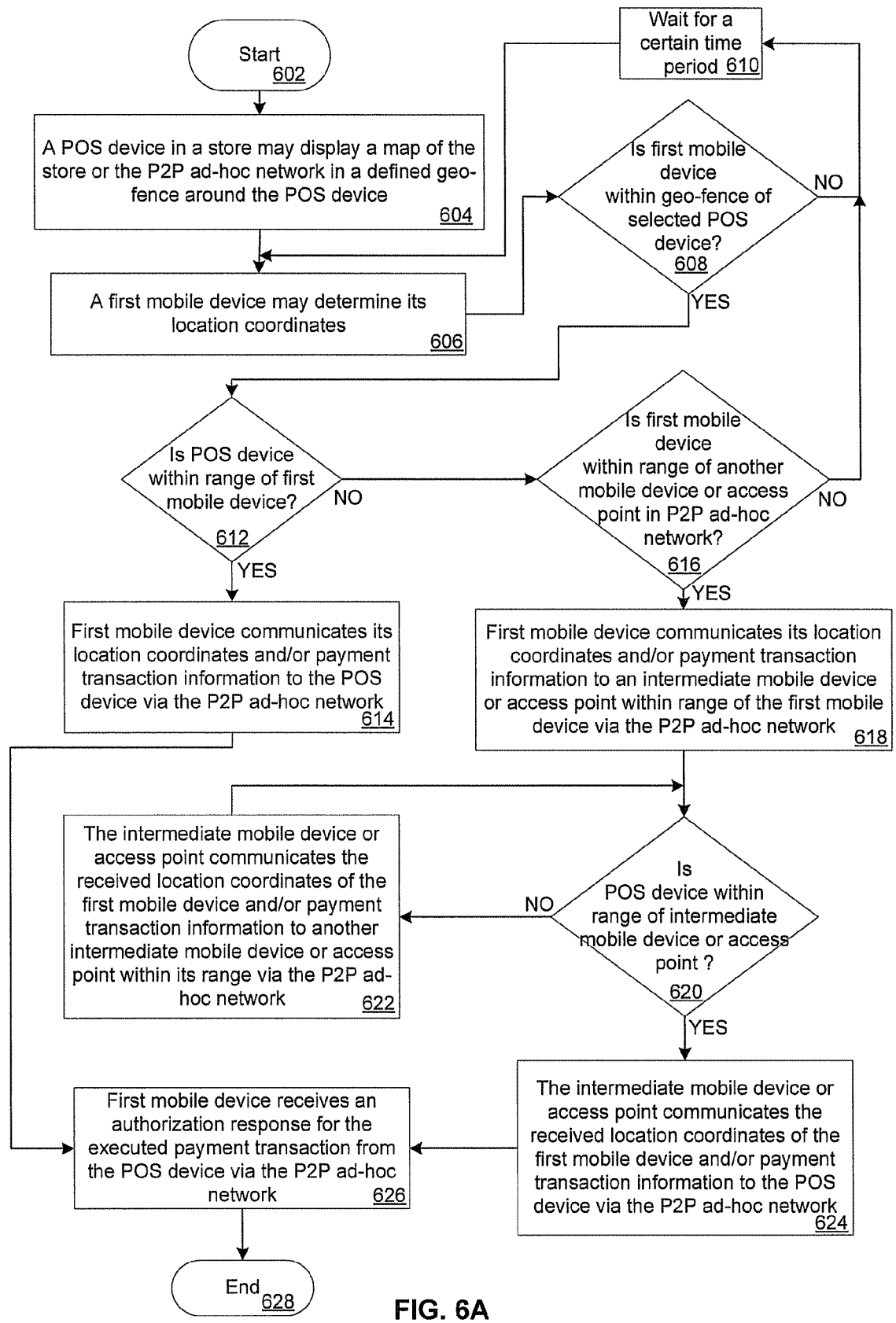
FIG. 6A is an exemplary flow chart illustrating exemplary steps for communicating location of a mobile device to a POS device via an exemplary peer-to-peer ad-hoc network, in accordance with an embodiment of the invention.

FIG. 6A is an exemplary flow chart illustrating exemplary steps for communicating location of a mobile device to a POS device via an exemplary peer-to-peer ad-hoc network, in accordance with an embodiment of the invention. Referring to FIG. 6A, exemplary steps may begin at step 602.

In step 604, a selected POS device 202 in a store may display a map 302 of the store or a peer-to-peer ad-hoc network 200 in a defined geo-fence 222 around the selected POS device 202. In step 606, a first mobile device 208 may determine its location coordinates. In accordance with an embodiment of the invention, the first mobile device 208 may determine its location coordinates based on one or more positioning methods as described in U.S. application Ser. No. 13/422,823, now published as U.S. Patent Publication 2013-0030931, filed on Mar. 16, 2012, which is hereby incorporated herein by reference in its entirety.

In step 608, the first mobile device 208 may determine whether it is within a generated geo-fence of a selected POS device 202. In instances where the first mobile device 208 is not within a generated geo-fence of the selected POS device 202, control passes to step 610. In step 610, after waiting for a certain period of time, control returns to step 606 to determine the location coordinates of the first mobile device 208. For example, the user of the mobile device 208 may be moving around and may be within the generated geo-fence of the selected POS device 202 after a certain period of time.

In instances where the first mobile device 208 is within a generated geo-fence of the selected POS device 202, a notification may be triggered on the mobile device 208 indicating its presence within the generated geo-fence of the selected POS device 202 and control passes to step 612. In step 612, the first mobile device 208 may determine whether the selected POS device 202 is within its range of communication. In instances where the selected POS device 202 is within a range of communication of the first mobile device 208, control passes to step 614. In step 614, the first mobile device 208 may communicate its location coordinates and/or payment transaction information to the selected POS device 202 directly or via the peer-to-peer ad-hoc network. For example, the first mobile device 208 may communicate an authorization to execute a payment transaction when the first mobile device 208 is within a generated geo-fence of the selected POS device 202 and the selected POS device 202 is within a range of communication of the first mobile device 208. Control then passes to step 626.

In instances where the selected POS device 202 is not within a range of communication of the first mobile device 208, control passes to step 616. In step 616, the first mobile device 208 may determine whether another intermediate mobile device or access point in the peer-to-peer ad-hoc network is within its range of communication. In instances where another intermediate mobile device or access point in the peer-to-peer ad-hoc network is not within a range of communication of the first mobile device 208, control passes to step 610. For example, the user of the mobile device 208 may be moving around and one or more intermediate mobile devices and/or access points in the peer-to-peer ad-hoc network may be within its range of communication after a certain period of time or the selected POS device 202 may be within its range of communication after a certain period of time.

In instances where another intermediate mobile device or access point in the peer-to-peer ad-hoc network is within a range of communication of the first mobile device 208, control passes to step 618. In step 618, the first mobile device 208 may communicate its location coordinates and/or payment transaction information to the intermediate mobile device 206 or access point in the peer-to-peer ad-hoc network. For example, the first mobile device 208 may communicate an authorization to execute a payment transaction when the first mobile device 208 is within a generated geo-fence of the selected POS device 202 and the intermediate mobile device 206 is within a range of communication of the first mobile device 208.

In step 620, it may be determined whether the selected POS device 202 is within a range of communication of the intermediate mobile device 206 or access point in the peer-to-peer ad-hoc network. In instances where the selected POS device 202 is not within a range of communication of the intermediate mobile device 206 or access point in the peer-to-peer ad-hoc network, control passes to step 622. In step 622, the intermediate mobile device 206 or access point in the peer-to-peer ad-hoc network may communicate the location coordinates of the first mobile device 208 and/or payment transaction information to another intermediate mobile device 204 or access point via the peer-to-peer ad-hoc network. For example, the intermediate mobile device 206 may communicate an authorization to execute a payment transaction to the intermediate mobile device 204 when the first mobile device 208 is within a generated geo-fence of the selected POS device 202 and the intermediate mobile device 204 is within a range of communication of the intermediate mobile device 206. Control then returns to step 620.

In instances where the selected POS device 202 is within a range of communication of the intermediate mobile device 206 or access point in the peer-to-peer ad-hoc network, control passes to step 624. In step 624, the intermediate mobile device or access point in the peer-to-peer ad-hoc network may communicate the first mobile device's 208 location coordinates and/or payment transaction information to the selected POS device 202 via the peer-to-peer ad-hoc network. For example, the intermediate mobile device may communicate an authorization to execute a payment transaction to the selected POS device 202 when the first mobile device 208 is within a generated geo-fence of the selected POS device 202 and the selected POS device 202 is within a range of communication of the intermediate mobile device. Control then passes to step 626.

The user with the mobile device 208 may choose to purchase one or more items within the store or the generated geo-fence 222. When the user with the mobile device 208 is ready to checkout, the mobile device 208 may communicate an authorization via the peer-to-peer ad-hoc network to the selected POS device 202 to execute a payment transaction based on the one or more items chosen to be purchased when the first mobile device 208 is within the defined geo-fence 222. In step 626, the first mobile device 208 may receive an authorization response for the executed payment transaction from the POS device 202 via the peer-to-peer ad-hoc network. For example, if the first mobile device 208 is within a range of communication of the selected POS device 202, the first mobile device 208 may receive an authorization response for the executed payment transaction directly from the selected POS device 202. In instances where the first mobile device 208 is not within a range of communication of the selected POS device 202, the first mobile device 208 may receive an authorization response for the executed payment transaction from the selected POS device 202 via one or more intermediate mobile devices and/or access points in the peer-to-peer ad-hoc network. Control then passes to end step 628. In accordance with an embodiment of the invention, the user with the mobile device 208 may be able to execute the payment transaction without physically using or swiping a credit or debit card, or without physically tapping or holding the mobile device 208 near the POS device 202.

Figure 6B:
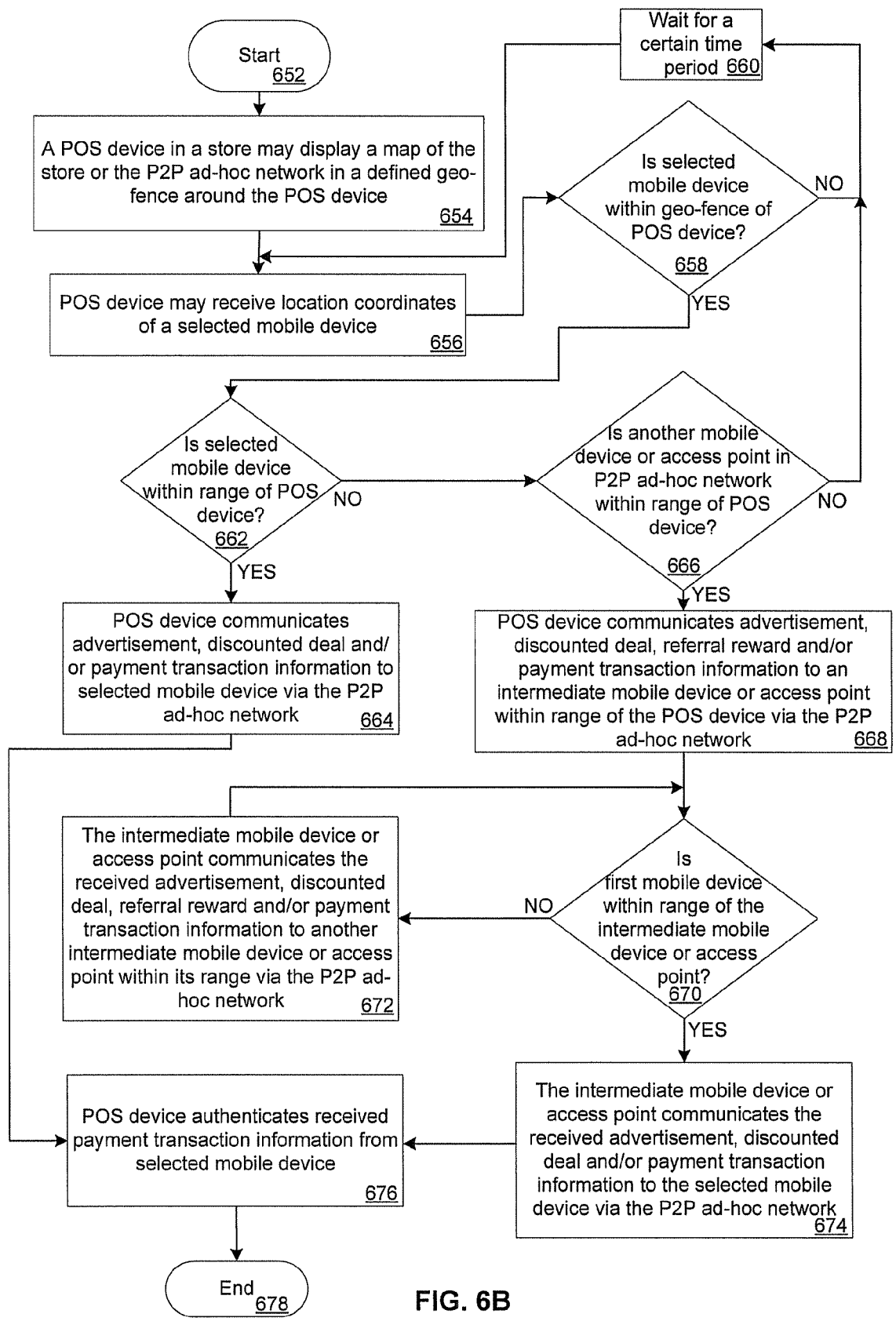
FIG. 6B is an exemplary flow chart illustrating exemplary steps for communicating advertisement and discounted deal information from a POS device to a mobile device via an exemplary peer-to-peer ad-hoc network, in accordance with an embodiment of the invention.

FIG. 6B is an exemplary flow chart illustrating exemplary steps for communicating advertisement and discounted deal information from a POS device to a mobile device via an exemplary peer-to-peer ad-hoc network, in accordance with an embodiment of the invention. Referring to FIG. 6B, exemplary steps may begin at step 652.

In step 654, a first POS device 202 in a store may display a map 302 of the store or a peer-to-peer ad-hoc network 200 in a defined geo-fence 222 around the first POS device 202. In step 656, the first POS device 202 may receive the location coordinates of a selected mobile device 208.

In step 658, the first POS device 202 may determine whether the selected mobile device 208 is within a generated geo-fence of the first POS device 202. In instances where the selected mobile device 208 is not within a generated geo-fence of the first POS device 202, control passes to step 660. In step 660, after waiting for a certain period of time, control returns to step 656, where the first POS device 202 may receive the location coordinates of the selected mobile device 208. For example, the user of the mobile device 208 may be moving around and may be within the generated geo-fence of the POS device 202 after a certain period of time.

In instances where the selected mobile device 208 is within a generated geo-fence of the first POS device 202, a notification may be triggered on the POS device 202 indicating the presence of the selected mobile device 208 within the generated geo-fence of the first POS device 202 and control passes to step 662. In step 662, the first POS device 202 may determine whether the selected mobile device 204 is within its range of communication. In instances where the selected mobile device 204 is within a range of communication of the first POS device 202, control passes to step 664. In step 664, the first POS device 202 may communicate advertisement, discounted deal and/or payment transaction information to the selected mobile device 204 directly or via the peer-to-peer ad-hoc network. For example, the first POS device 202 may communicate advertisement information and/or discounted deal information for one or more items recently purchased by the user of the mobile device 204 when the selected mobile device 204 is within a generated geo-fence of the first POS device 202 and the selected mobile device 204 is within a range of communication of the first POS device 202. Control then passes to step 676.

In instances where the selected mobile device 208 is not within a range of communication of the first POS device 202, control passes to step 666. In step 666, the first POS device 202 may determine whether another intermediate mobile device or access point in the peer-to-peer ad-hoc network is within its range of communication. In instances where another intermediate mobile device or access point in the peer-to-peer ad-hoc network is not within a range of communication of the first POS device 202, control passes to step 660. For example, the users of various mobile devices may be moving around and one or more intermediate mobile devices and/or access points in the peer-to-peer ad-hoc network may be within a range of communication of the POS device 202 after a certain period of time or the selected mobile device 208 may be within a range of communication of the POS device 202 after a certain period of time.

In instances where another intermediate mobile device or access point in the peer-to-peer ad-hoc network is within a range of communication of the first POS device 202, control passes to step 668. In step 668, the first POS device 202 may communicate advertisement, discounted deal, referral reward, and/or payment transaction information to the intermediate mobile device 204 or access point in the peer-to-peer ad-hoc network. For example, the first POS device 202 may communicate advertisement information and discounted deal information for one or more items recently purchased by the user of the mobile device 208 to the intermediate mobile device 204 when the first mobile device 208 is within a generated geo-fence of the selected POS device 202 and the intermediate mobile device 204 is within a range of communication of the first POS device 202. The first POS device 202 may also communicate referral reward information to the intermediate mobile device 204.

In step 670, it may be determined whether the selected mobile device 208 is within a range of communication of the intermediate mobile device 204 or access point in the peer-to-peer ad-hoc network. In instances where the selected mobile device 208 is not within a range of communication of the intermediate mobile device 204 or access point in the peer-to-peer ad-hoc network, control passes to step 672. In step 672, the intermediate mobile device 204 or access point in the peer-to-peer ad-hoc network may communicate advertisement, discounted deal, referral reward, and/or payment transaction information to another intermediate mobile device 206 or access point via the peer-to-peer ad-hoc network. For example, the intermediate mobile device 204 may communicate advertisement information and discounted deal information for one or more items recently purchased by the user of the mobile device 208 to the intermediate mobile device 206 when the selected mobile device 208 is within a generated geo-fence of the first POS device 202 and the intermediate mobile device 206 is within a range of communication of the intermediate mobile device 204. The intermediate mobile device 204 may also communicate referral reward information to the intermediate mobile device 206. Control then returns to step 670.

In instances where the selected mobile device 208 is within a range of communication of the intermediate mobile device 206 or access point in the peer-to-peer ad-hoc network, control passes to step 674. In step 674, the intermediate mobile device 206 or access point in the peer-to-peer ad-hoc network may communicate advertisement, discounted deal and/or payment transaction information to the selected mobile device 208 via the peer-to-peer ad-hoc network. For example, the intermediate mobile device 206 may communicate advertisement information and discounted deal information for one or more items recently purchased by the user of the mobile device 208 to the selected mobile device 208, when the selected mobile device 208 is within a generated geo-fence of the first POS device 202 and the selected mobile device 208 is within a range of communication of the intermediate mobile device 206. Control then passes to step 676.

The user with the mobile device 208 may choose to purchase one or more items within the store or the generated geo-fence 222. When the user with the mobile device 208 is ready to checkout, the mobile device 208 may communicate an authorization via the peer-to-peer ad-hoc network to the POS device 202 to execute a payment transaction based on the one or more items chosen to be purchased when the mobile device 208 is within the defined geo-fence 222. In step 676, the POS device 202 may authenticate the received payment transaction information from the mobile device 208. For example, the POS device 202 may authenticate the received payment transaction information from the selected mobile device 208 based on one or more of a voice recognition, a gesture, a computer face recognition and/or a biometric recognition, for example.

The POS device 202 may communicate an authorization response or acknowledgement for the executed payment transaction to the mobile device 208 via the peer-to-peer ad-hoc network. For example, if the selected mobile device 208 is within a range of communication of the first POS device 202, the first POS device 202 may communicate an authorization response for the executed payment transaction directly to the selected mobile device 208. In instances where the selected mobile device 208 is not within a range of communication of the first POS device 202, the first POS device 202 may communicate an authorization response for the executed payment transaction to the selected mobile device 208 via one or more intermediate mobile devices and/or access points in the peer-to-peer ad-hoc network. Control then passes to end step 678.

In accordance with an embodiment of the invention, a method and system for communicating location of a mobile device for hands-free payment may comprise a peer-to-peer ad-hoc network 200 (FIG. 2) comprising a plurality of mobile devices 204 (FIG. 2), 206 (FIG. 2), 208 (FIG. 2), 210 (FIG. 2), a plurality of access points 218 (FIG. 2 and 220 (FIG. 2), and a plurality of point of sale devices 202 (FIG. 2). A first of the plurality of mobile devices, for example, the mobile device 208 may be operable to determine its location coordinates. The first mobile device 208 may communicate its determined location coordinates to a selected one of the plurality of POS devices, for example, the POS device 202 via the peer to peer ad-hoc network 200. At least one of the plurality of mobile devices, for example, mobile device 204 and/or the plurality of access points, for example, access point 218 is within a defined proximity of the selected POS device 202.

The first mobile device 208 may determine whether it is within the defined proximity of the selected POS device 202 based on a generated geo-fence 222 (FIG. 2) around the selected POS device 202. The first mobile device 208 may communicate an authorization to execute a payment transaction when the first mobile device 208 is within the generated geo-fence 222 around the selected POS device 202. The first mobile device 208 may communicate an authorization to execute a payment transaction to the selected POS device via the peer to peer ad-hoc network 200. The first mobile device 208 may receive an authorization response for the executed payment transaction from the selected POS device 202 via the peer to peer ad-hoc network 200. The first mobile device 208 may receive one or both of advertisement information and/or discounted deal information from the selected POS device 202 via the peer to peer ad-hoc network 200.

The first mobile device 208 may communicate its determined location coordinates to the selected POS device 202 via the peer to peer ad-hoc network 200 using short-range wireless communication protocols. The short-range wireless communication protocols may comprise one or more of near field communication (NFC), Wireless Local Area Network (WLAN), Bluetooth, WiMax, Wi-Fi Direct, radio frequency identification (RFID), Ultra-wideband (UWB), cellular, and/or 60 Ghz protocols.

The first mobile device 208 may communicate its determined location coordinates directly to the selected POS device 202, if the selected POS device 202 is within a range of the first mobile device 208. The first mobile device 208 may communicate its determined location coordinates to one or more intermediate ones of the plurality of mobile devices, for example, mobile devices 206 and 204 and/or the plurality of access points within a range of the first mobile device 208, if the selected POS device 202 is not within a range of the first mobile device 208.

In accordance with another embodiment of the invention, a method and system for communicating location of a mobile device for hands-free payment may comprise a peer-to-peer ad-hoc network 200 (FIG. 2) comprising a plurality of mobile devices 204 (FIG. 2), 206 (FIGS. 2), and 208 (FIG. 2), and a plurality of POS devices, for example, POS device 202 (FIG. 2).

The first of the plurality of POS devices, for example, POS device 202 may receive via one or more intermediate ones of the plurality of mobile devices, for example, mobile devices 204 and 206 in the peer to peer ad-hoc network 200, location coordinates and payment transaction information of a selected one of the plurality of mobile devices, for example, mobile device 208. At least one of the one or more intermediate ones of the plurality of mobile devices, for example, mobile device 204 is within a defined proximity or generated geo-fence 222 (FIG. 2) of the first POS device 202. The POS device 202 may communicate one or more of advertisement information, discounted deal information, and/or referral reward information to at least one of the one or more intermediate ones of the plurality of mobile devices, for example, mobile device 204 within a range of the first POS device 202.

The POS device 202 may receive the location coordinates and the payment transaction information directly from the selected mobile device 208, if the selected mobile device 208 is within a range of communication of the first POS device 202. The POS device 202 may receive an authorization to execute a payment transaction from the selected mobile device 208 via the peer to peer ad-hoc network 200 when the selected mobile device 208 is within the defined proximity or the generated geo-fence 222 of the first POS device 202. The POS device 202 may communicate an authorization response for the executed payment transaction to the selected mobile device 208 via the peer to peer ad-hoc network 200. The POS device 202 may receive a speed of movement and a direction of movement of the selected mobile device 208. The POS device 202 may generate a map 302 (FIG. 3) indicating a location of the selected mobile device $312_6$ (FIG. 3) and at least a portion of one or more intermediate ones of the plurality of mobile devices, for example, mobile devices $312_5$ (FIGS. 3) and $312_4$ (FIG. 3) in the peer to peer ad-hoc network 301 (FIG. 3). The POS device 202 may authenticate the received payment transaction information from the selected mobile device 208 based on one or more of a voice recognition, a computer face recognition and/or a biometric recognition.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps comprising a peer-to-peer ad-hoc network that comprises a plurality of mobile devices, a plurality of access points, and a plurality of POS devices. A first mobile device may determine its location coordinates and communicate them to a selected POS device via the peer to peer ad-hoc network. At least one of the plurality of mobile devices and/or the plurality of access points may be within a defined proximity of the selected POS device. In another embodiment of the invention, the first POS device may receive via one or more intermediate mobile devices in the peer-to-peer ad-hoc network, location coordinates and payment transaction information of a selected mobile device. At least one of the intermediate mobile devices may be within a defined proximity of the first POS device.

Accordingly, the present invention may be realized in hardware, or a combination of hardware and software. The present invention may be realized in a centralized fashion in at least one computer system, or in a distributed fashion where different elements may be spread across several interconnected computer systems. Any kind of computer system or other apparatus adapted for carrying out the methods described herein may be suited. A combination of hardware and software may be a general-purpose computer system with a computer program that, when being loaded and executed, may control the computer system such that it carries out the methods described herein. The present invention may be realized in hardware that comprises a portion of an integrated circuit that also performs other functions.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for performing point of sale transactions in a peer-to-peer ad-hoc network comprising a plurality of mobile devices, a plurality of access points, and a point of sale device, the method comprising:

defining a first geo-fence around the point of sale device for receiving payment transaction orders;

defining a second geo-fence around the point of sale device for completing the ordered payment transactions, the second geo-fence within the first geo-fence;

determining location coordinates of a first mobile device of said plurality of mobile devices;

accepting a payment transaction order form the first mobile device after determining, based on the location coordinates of the first mobile device, that the first mobile device is within the first geo-fence of the point of sale device, wherein accepting the payment transaction order comprises receiving said payment transaction order at the point of sale device from the first mobile device via at least one of (i) said plurality of mobile devices and (ii) said plurality of access points of the peer to peer ad-hoc network that is within the defined first geo-fence of the point of sale device; and executing the payment transaction order received from the first mobile device after determining that the first mobile device is within the second geo-fence of the point of sale device.

2. The method according of claim 1 further comprising determining whether said first of said plurality of mobile devices is within a defined proximity of the point of sale device based on one of said first and second geo-fences defined around the point of sale device.

3. The method of claim 2 further comprising communicating an authorization to execute the payment transaction when the first mobile device is within the second geo-fence around the point of sale device.

4. The method of claim 1 further comprising communicating an authorization to execute the payment transaction to the point of sale device via said peer to peer ad-hoc network.

5. The method of claim 4 further comprising receiving an authorization response for said executed payment transaction from the point of sale device via said peer to peer ad-hoc network.

6. The method of claim 1 further comprising receiving, at the first mobile device, at least one of advertisement information and discounted deal information from the point of sale devices via said peer to peer ad-hoc network.

7. The method of claim 1 further comprising communicating said determined location coordinates to the point of sale device via said peer to peer ad-hoc network using short range wireless communication protocols.

8. The method of claim 7, wherein said short range wireless communication protocols comprise at least one of near field communication (NFC), Wireless Local Area Network (WLAN), Bluetooth, WiMax, Wi-Fi Direct, radio frequency identification (RFID), Ultra-wideband (UWB), cellular, and 60 Ghz protocols.

9. The method of claim 1 further comprising communicating said determined location coordinates directly from the first mobile device to the point of sale device, if the point of sale device is within a range of the first mobile device.

10. The method of claim 1 further comprising communicating said determined location coordinates from the first mobile device to at least one of (i) intermediate ones of said plurality of mobile devices and (ii) said plurality of access points within a range of the first mobile device, if the point of sale device is not within a range of the first mobile device.

11. A method for performing point of sale transactions in a peer-to-peer ad-hoc network comprising a plurality of mobile devices and a plurality of point of sale devices, wherein a geo-fence is defined around each of the plurality of point of sale devices, the method comprising:
registering a first mobile device in the plurality of mobile devices for performing point of sale transactions, the registering comprising providing identification credential information of a user of the first mobile device and payment information;
sending a payment transaction request from the first mobile device to a first point of sale device of said plurality of point of sale devices via one or more intermediate ones of said plurality of mobile devices in said peer to peer ad-hoc network, wherein the payment transaction request does not include payment method details for the requested payment transaction, wherein at least one of said one or more intermediate ones of said plurality of mobile devices is within the geo-fence defined around said first point of sale device; and
executing the payment transaction received from the registered first mobile device without requiring the transaction request to include said payment method details for the transaction.

12. The method of claim 11 further comprising communicating at least one of advertisement information, discounted deal information, and referral reward information from the first point of sale device to the first mobile device through said at least one of said one or more intermediate ones of said plurality of mobile devices within a range of the first point of sale device.

13. The method of claim 11 further comprising receiving location coordinates and payment transaction information directly from the first mobile device, if the first mobile device is within a range of the first point of sale device.

14. The method of claim 11 further comprising receiving an authorization to execute the payment transaction from the first mobile device via said peer to peer ad-hoc network when the first mobile device is within the geo-fence defined around the first point of sale device.

15. The method of claim 14 further comprising communicating an authorization response for said executed payment transaction to the mobile device via said peer to peer ad-hoc network.

16. The method of claim 11 further comprising receiving a speed of movement and a direction of movement of the first mobile device at the first point of sale device.

17. The method of claim 11 further comprising generating a map indicating a location of the first mobile device and at least a portion of said one or more intermediate ones of the first mobile device in said peer to peer ad-hoc network.

18. The method of claim 11 further comprising authenticating said received payment transaction information from the first mobile device based on at least one of a voice recognition, a gesture, a computer face recognition, and a biometric recognition.

19. A system for performing point of sale transactions, the system comprising:
a peer-to-peer ad-hoc network comprising:
a plurality of mobile devices comprising a first mobile device, the first mobile device comprising at least one processor and a set of circuits;
a plurality of access points; and
a point of sale device;
wherein the first mobile device is configured to determine location coordinates of the first mobile device;
wherein the point of sale device is configured to:
define a first geo-fence around the point of sale device for receiving payment transaction orders;
define a second geo-fence around the point of sale device for completing the payment ordered transactions, the second geo-fence within the first geo-fence;
accept a payment transaction order form the first mobile device after determining, based on the location coordinates of the first mobile device, that the first mobile device is within the first geo-fence of the point of sale device, wherein accepting the payment transaction order comprises receiving said payment transaction order at the point of sale device from the first mobile device via at least one of (i) said plurality of mobile devices and (ii) said plurality of access points of said peer to peer ad-hoc network that is within the defined first geo-fence of the point of sale device; and
execute the payment transaction order received from the first mobile device after determining that the first mobile device is within the second geo-fence of the point of sale device.

20. The system of claim 19, wherein the first mobile device is further configured to determine whether the first mobile device is within a defined proximity of the point of sale device based on one of said first and second geo-fences around the point of sale device.

21. The system of claim 20, wherein the first mobile device and the point of sale device are further configured to communicate an authorization to execute the payment transaction when the first mobile device is within the second geo-fence around said one of said plurality of point of sale devices.

22. The system of claim 19, wherein the first mobile device is further configured to communicate an authorization to execute the payment transaction to the point of sale device via said peer to peer ad-hoc network.

23. The system of claim 22, wherein the first mobile device is further configured to receive an authorization response for said executed payment transaction from the point of sale device via said peer to peer ad-hoc network.

24. The system of claim 19, wherein the first mobile device is further configured to receive at least one of advertisement information and discounted deal information from the point of sale device via said peer to peer ad-hoc network.

25. The system of claim 19, wherein the first mobile device is further configured to communicate said determined location coordinates to the point of sale device via said peer to peer ad-hoc network using short range wireless communication protocols.

26. The system of claim 25, wherein said short range wireless communication protocols comprise at least one of near field communication (NFC), Wireless Local Area Network (WLAN), Bluetooth, WiMax, Wi-Fi Direct, radio frequency identification (RFID), Ultra-wideband (UWB), cellular, and 60 Ghz protocols.

27. The system of claim 19, wherein the first mobile device is further configured to communicate said determined location coordinates directly to the point of sale device, if the point of sale device is within a range of the first mobile device.

28. The system of claim 19, wherein the first mobile device is further configured to communicate said determined location coordinates to at least one of intermediate ones of said plurality of mobile devices and said plurality of access points within a range of the mobile device, if the point of sale device is not within a range of the first mobile device.

29. A system for performing point of sale transactions, the system comprising:
a peer-to-peer ad-hoc network comprising:
a plurality of mobile devices comprising a first mobile device; and
a plurality of point of sale devices comprising a first point of sale device, wherein a geo-fence is defined around the first point of sale device, wherein the first point of sale device comprises one or more processors and a set of circuits;
wherein the first point of sale device is configured to:
register the first mobile device for performing point of sale transactions, the registering comprising receiving identification credential information of a user of the first mobile device and payment information;
receive a payment transaction request from the first mobile device via one or more intermediate ones of said plurality of mobile devices in said peer to peer ad-hoc network, wherein the payment transaction request does not include payment method details for the requested payment transaction, wherein at least one of said one or more intermediate ones of said plurality of mobile devices is within the geo-fence defined around said first point of sale device,
receive the payment transaction request from the first mobile device through said one or more intermediate ones of said plurality of mobile devices; and
execute the requested payment transaction received from the registered first mobile device without requiring the transaction request to include said payment method details for the transaction.

30. The system of claim 29, wherein the first point of sale device is further configured to communicate at least one of advertisement information, discounted deal information, and referral reward information to the first mobile device through one or more intermediate ones of said plurality of mobile devices within a range of the first point of sale device.

31. The system of claim 29, wherein the first point of sale device is further configured to receive location coordinates and said payment transaction information directly from the first mobile device, if the mobile device is within a range of the first point of sale device.

32. The system of claim 29, wherein the first point of sale device is further configured to receive an authorization to execute a payment transaction from the first mobile device via said peer to peer ad-hoc network when the first mobile device is within a defined proximity of the first point of sale device.

33. The system of claim 32, wherein the first point of sale device is further configured to communicate an authorization response for said executed payment transaction to the first mobile device via said peer to peer ad-hoc network.

34. The system of claim 29, wherein the first point of sale device is further configured to receive a speed of movement and a direction of movement of the first mobile device.

35. The system of claim 29, wherein the first point of sale device is further configured to generate a map indicating a location of the mobile device and at least a portion of said one or more intermediate ones of said plurality of mobile devices in said peer to peer ad-hoc network.

36. The system of claim 29, wherein the first point of sale device is further configured to authenticate said received payment transaction information from the first mobile device based on at least one of a voice recognition, a gesture, a computer face recognition and a biometric recognition.

* * * * *